June 25, 1940.　　　L. D. WHITE ET AL　　　2,205,894
SUPERVISORY CONTROL SYSTEM
Filed Dec. 3, 1936　　5 Sheets-Sheet 1

Inventors:
Leo D. White,
Clyde E. Stewart,
by Harry E. Dunham
Their Attorney.

Patented June 25, 1940

2,205,894

UNITED STATES PATENT OFFICE 2,205,894

SUPERVISORY CONTROL SYSTEM

Leo D. White, Lansdowne, and Clyde E. Stewart, Upper Darby, Pa., assignors to General Electric Company, a corporation of New York Application December 3, 1936, Serial No. 114,002

24 Claims. (Cl. 177—353)

Our invention relates to supervisory control systems for supervising and controlling apparatus in a remote station from a control station such as a dispatcher's office.

One object of our invention is to provide an improved two-wire supervisory control system of the type disclosed and claimed in United States Letters Patent 2,107,902, granted February 8, 1938, on the copending application, Serial No. 689,087, filed September 12, 1933, by James H. Oliver and assigned to the same assignee as this application. In this type of system a desired apparatus unit in the remote station is selected by transmitting to the remote station over two line conductors which interconnect the two stations, a predetermined code of current impulses individual to the desired apparatus unit. After the selection is made, it is checked by transmitting over the two line conductors in series to the control station a predetermined code of impulses individual to the selected unit and then an impulse of a character corresponding to the position of the selected unit. If the check code corresponds to the select code, the selected apparatus unit can then be operated by transmitting an impulse over the two line conductors.

Another object of our invention is to provide a two-wire supervisory control system of the above mentioned type which requires a minimum amount of apparatus and a minimum amount of time to effect a desired supervisory and control operation.

Another object of our invention is to provide an arrangement whereby in addition to the transmission of a check code to the control station after an apparatus unit has been selected and the transmission of an indication impulse corresponding to the position of the selected unit, an indication check impulse is also transmitted over the two line conductors to the remote station after the indication impulse has been transmitted and this indication check impulse has to agree with the indication impulse in order for the necessary connections to be established so that the selected unit can be operated by the dispatcher at the control station.

Our invention will be better understood from the following description when taken in connection with the accompanying drawings, and its scope will be pointed out in the appended claims.

Figure 1:
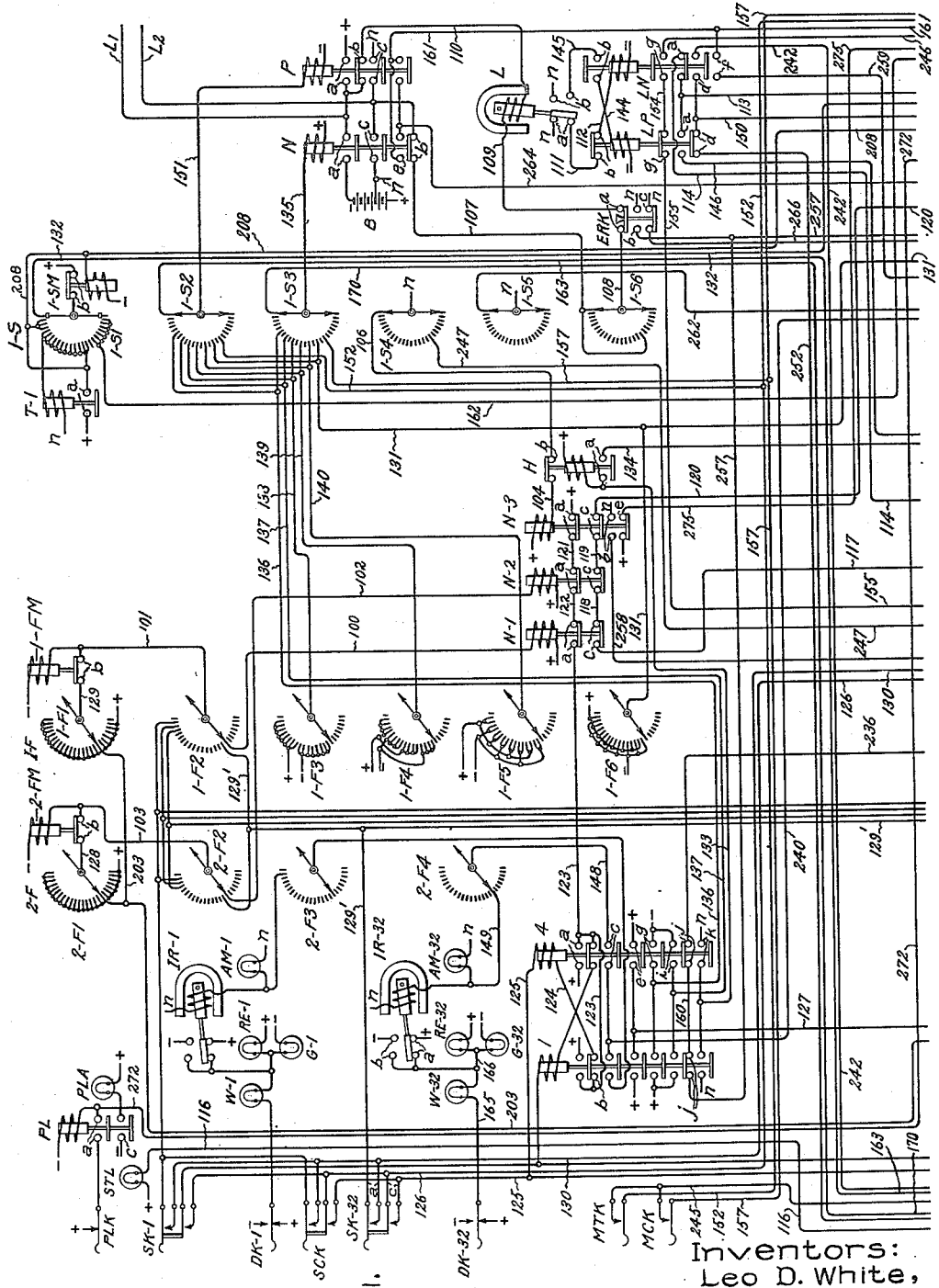
Figure 2:
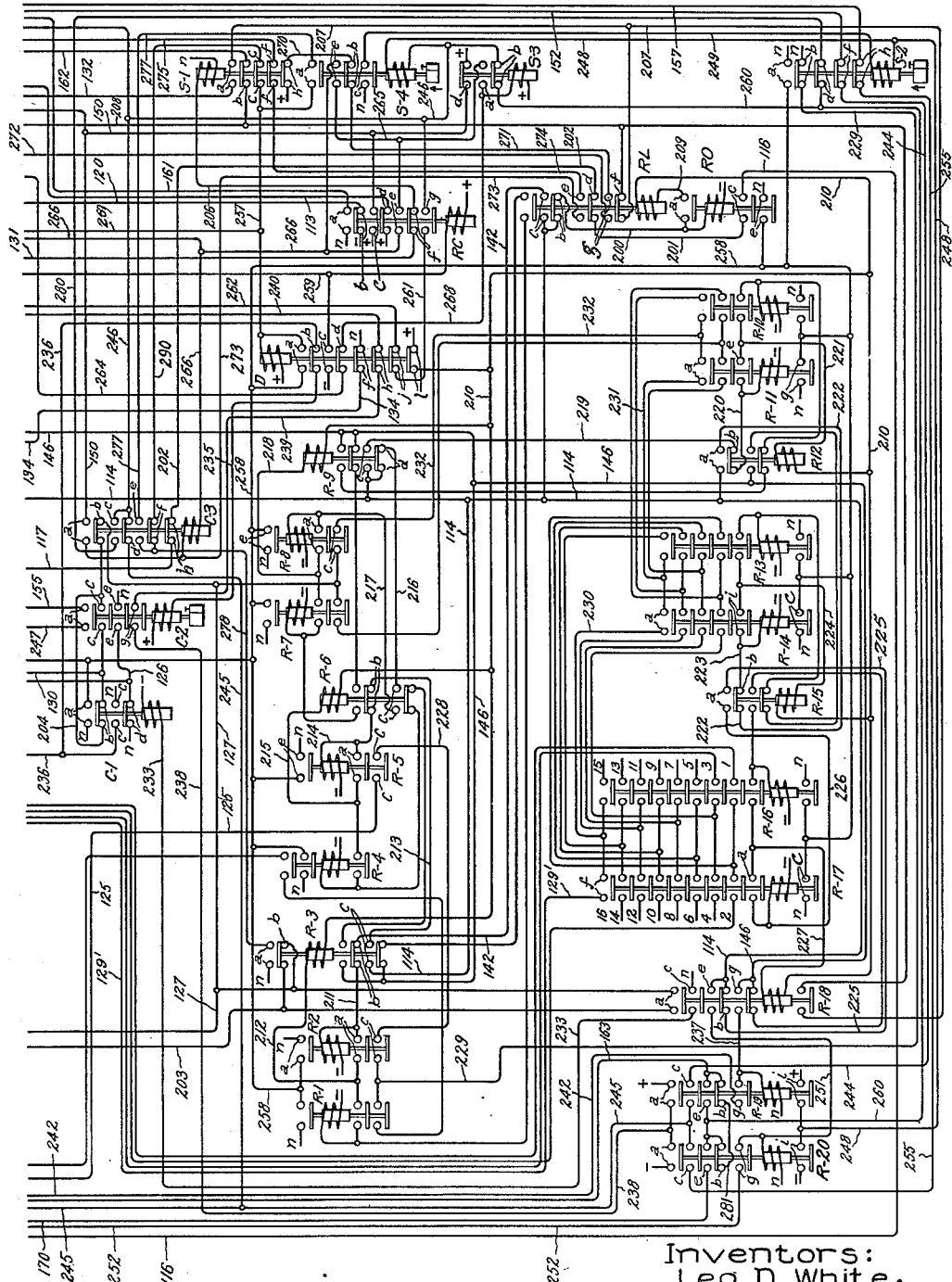
Figure 3:
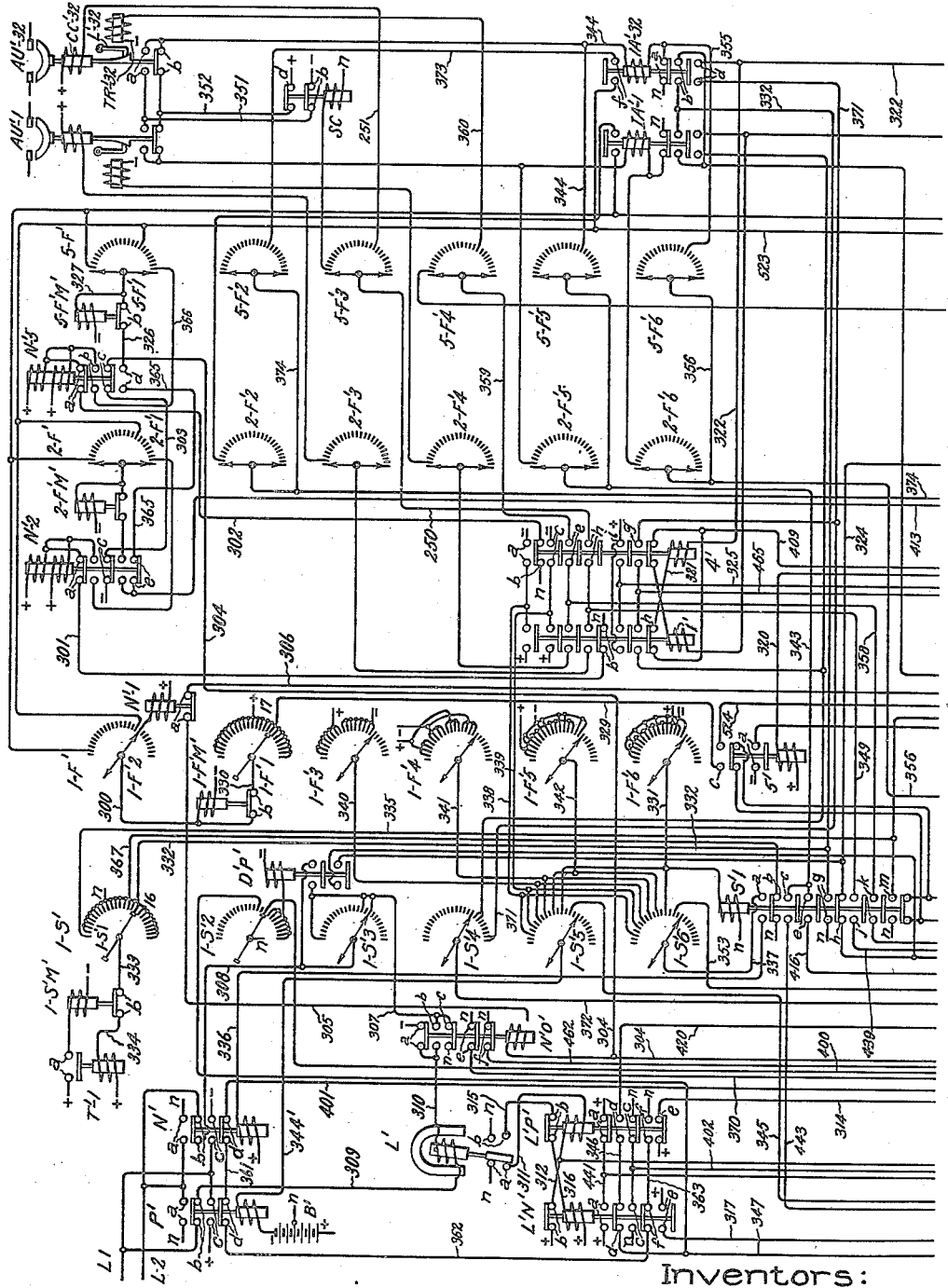
Figure 4:
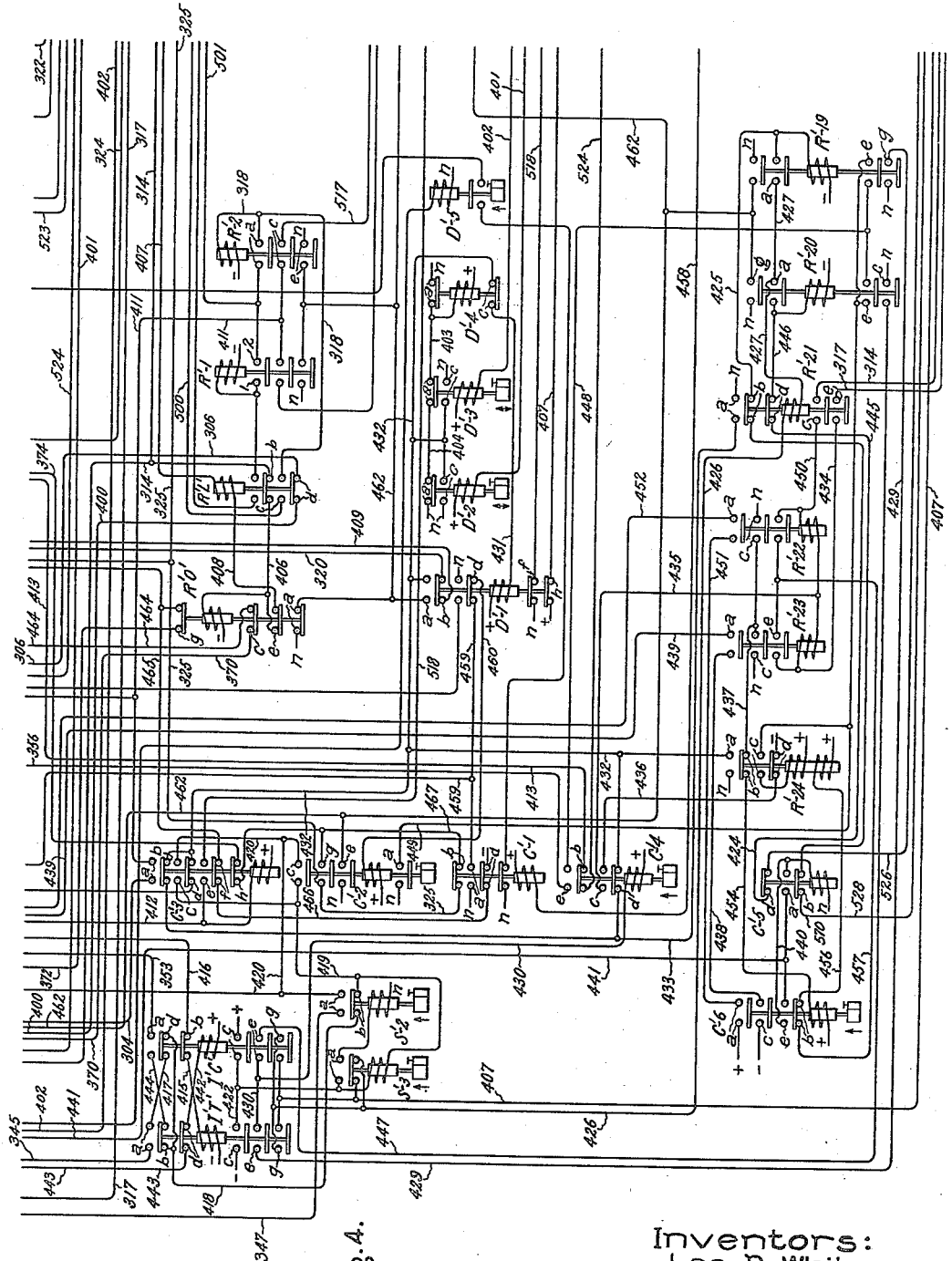
Figure 5:
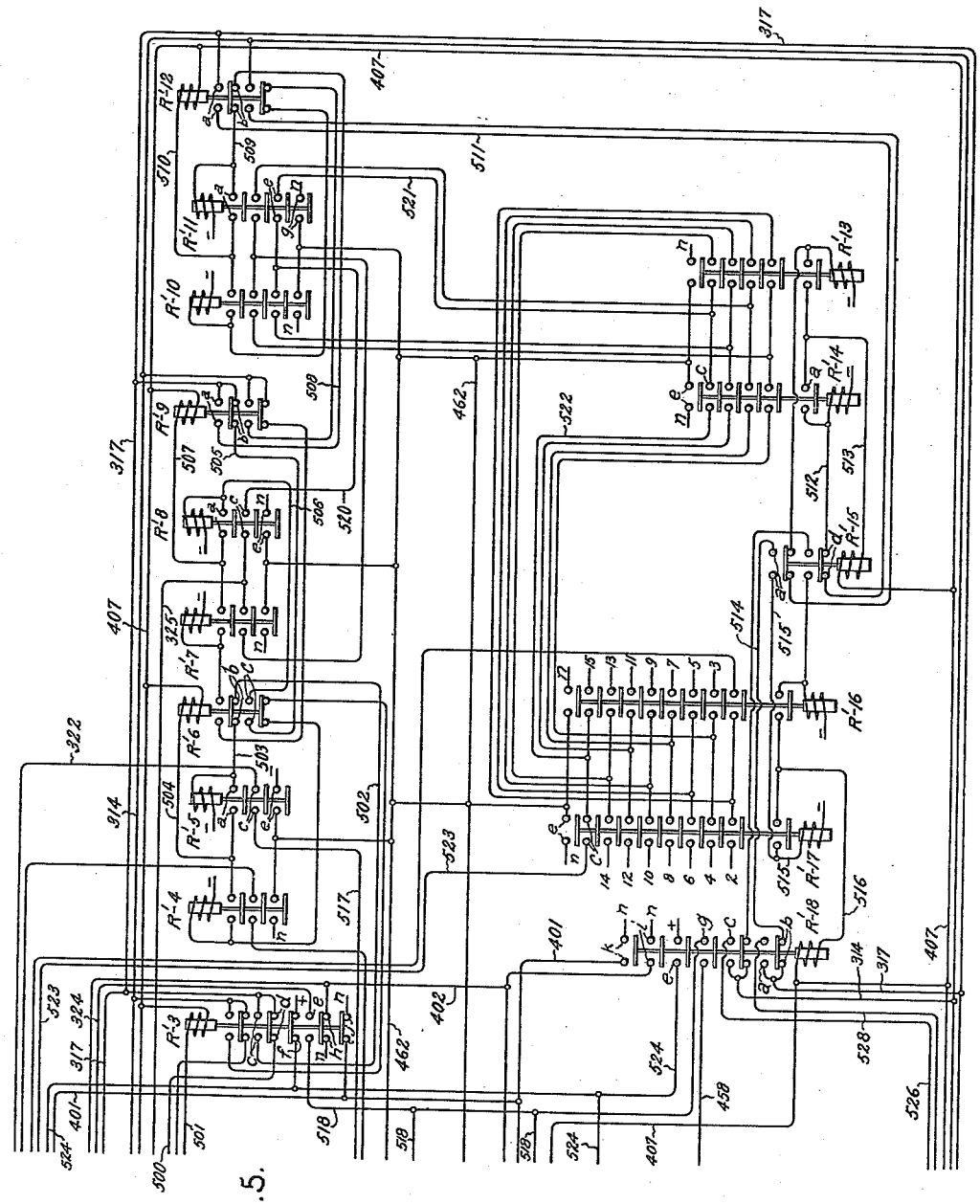

Referring to the accompanying drawings, which comprises Figs. 1 to 5, inclusive, sufficient apparatus and circuits of a supervisory control system embodying our invention have been shown therein, by means of the usual conventional diagrams to enable our invention to be readily explained and understood by those skilled in the art. The apparatus and circuits diagrammatically shown in Figs. 1 and 2 are located in the control or dispatcher's office, and the apparatus and circuits diagrammatically shown in Figs. 3, 4 and 5 are located at the remote station, which is connected to the dispatcher's office by the two line conductors L—1 and L—2.

At the dispatchers office, we provide a group of control keys and indicating lamps for each apparatus unit to be selected and controlled at the remote station. In the particular system shown in detail in the drawings, it is possible to make thirty-two different selections at the remote station. Therefore, it is possible to have thirty-two different groups of keys and lamps at the dispatcher's office. However, in order to simplify the disclosure, only two groups of keys and lamps are shown, one of the groups corresponding to the apparatus unit AU'—1 at the remote station and the other group corresponding to the apparatus unit AU'—32. The thirty-two possible selections in the particular system shown are divided into two groups of sixteen selections, and the selection whereby apparatus unit AU'—1 is selected is in one group and the selection whereby apparatus unit AU'—32 is selected is in the other group.

Each group of keys consists of a two-position select key such as SK—1 and SK—32, which is operated by the dispatcher when he wants to select the corresponding apparatus unit for operation and a two-position disagreement key such as DK—1 and DK—32 which controls the operation of the corresponding indicating lamps. Each group of indicating lamps consists of a red lamp such as RE—1 and RE—32 which, when lighted, indicates that the corresponding apparatus unit is in its closed position; a green lamp such as G—1 and G—2 which, when lighted, indicates that the corresponding apparatus unit is in its open position; a white lamp, such as W—1 and W—32, which, when lighted, indicates that the position of the corresponding apparatus unit does not correspond with the position of the associated disagreement key; and an amber lamp such as AM—1 and AM—32, which, when lighted, indicates that the corresponding apparatus unit has been properly selected for operation. Each group of keys and lamps has associated therewith an individual indicating relay such as IR—1 and IR—32 which determines by its position whether the associated red or green lamp is lighted and which cooperates with the associated control key to determine whether the associated white lamp is lighted. The position of each indicating relay in turn is determined by the position of the corresponding apparatus unit in a manner which will be hereinafter described.

As shown in Fig. 1, the indicating relays IR—1 and IR—32 are in the positions they occupy when the corresponding apparatus units AU'—1 and AU'—32 are in their open positions and the control keys DK—1 and DK—32 are shown in the corresponding positions so that the green lamps G—1 and G—32 are lighted and the other lamps associated with select keys SK—1 and SK—32 are not lighted. It will be readily seen from Fig. 1 that if either disagreement key should be moved to its other position, the associated white lamp would be lighted.

When the dispatcher desires to make a certain selection at the remote station, he operates the corresponding select key at the dispatcher's office and this effects at the dispatcher's office the operation of two finder switches 1—F and 2—F to positions corresponding to the operated select key. The operation of the select key also effects the energization of either the group relay 1 or the group relay 4, depending upon which group of sixteen selections at the remote station the desired selection is in. The energized group relay and the position of the finder switch 1—F sets up a code, consisting of a series of six positive and negative current impulses, which is individual to the operated select key. As soon as the finder switch 1—F stops in the position corresponding to the operated select key, the operation of a code sender 1—S is initiated to transmit over the two line conductors L—1 and L—2 the code which has been set up by the energized group relay and the operated finder switch 1—F.

As shown in the drawing, the finder switches 1—F and 2—F and the code sender 1—S are selector switches of the well-known rotary type comprising a plurality of banks of twenty-five contacts, each bank having associated therewith a cooperating wiper. Each switch is provided with a suitable operating magnet for simultaneously moving all of the wipers thereof in a step by step movement over the contacts of the respective banks. As shown in Fig. 1, the finder switch 1—F consists of six banks, 1—F1 to 1—F6, inclusive, a cooperating wiper for each bank, and an operating magnet 1—FM; the finder switch 2—F consists of four banks, 2—F1 to 2—F4, inclusive, a cooperating wiper for each bank and an operating magnet 2—FM; and the code sender 1—S consists of six banks 1—S1 to 1—S6, inclusive, a cooperating wiper for each bank, and an operating magnet 1—SM., Normally, each of the finder switches 1—F and 2—F is in its position 17 as shown in the drawings. The operation of any select key causes each finder switch to move from its position 17 to a position corresponding to the operated select key. For example, when the select key SK—1 is operated, each finder switch moves to its position 1 and when the select key SK—32 is operated, each of these switches moves to its position 16. These switches remain in these new positions until the operated select key is restored to its normal position. When the switch 1—F stops in any one of its positions 1 to 16, inclusive, corresponding to an operated select key, the operating magnet 1—SM of the code sender 1—S is operated to move the code sender 1—S from its normal position to its position 17. During this operation of the code sender 1—S a circuit is completed in its positions 5, 7, 9, 11, 13, and 15 for either the relay P or the relay N depending upon the position of the finder switch 1—F and upon which group relay is energized. The relay P, when energized, is arranged to cause a positive impulse to be transmitted over the line conductors L—1 and L—2 and the relay N, when energized, is arranged to cause a negative impulse to be transmitted over the line conductors L—1 and L—2. In this manner, a series of six positive and negative impulses permutated individual to the operated select key is transmitted to the remote station to effect the desired selection.

At the remote station, each of these current impulses energizes a polarized relay L' so that it effects the energization of the relay L'P' in response to a positive impulse and the relay L'N' in response to a negative impulse. The relays L'P' and L'N' are so connected that the first impulse of the series of six impulses constituting the select code effects the energization of either the relay R'—1 or R'—2, depending upon the polarity of the impulse. At the termination of this first impulse, relay R'—3 is energized to transfer the connections so that the second impulse of the select code effects the energization of either the relay R'—4 or R'—5, depending upon the polarity of the second impulse. At the termination of the second impulse the relay R'—6 is energized to transfer the connections so that the third impulse of the select code effects the operation of either the relay R'—7 or R'—8, depending upon the polarity of the third impulse. In a similar manner, the relays R'—9, R'—12, R'—15, and R'—18 are respectively energized at the end of the third, fourth, fifth, and sixth impulses of the select code and either the relay R'—10 or R'—11 is energized in response to the fourth impulse and either the relay R'—13 or R'—14 is energized in response to the fifth impulse and either the relay R'—16 or R'—17 is energized in response to the sixth impulse of the select code.

The combination in which the relays R'—1, R'—2, R'—4, and R'—5 are energized in response to the first two impulses of the select code determines which of the two group relays 1' and 4' at the remote station is energized after the second impulse. In the particular arrangement shown, the relay 1' is energized when the desired selection is one of the group of sixteen selections which includes the selection whereby apparatus unit AU'—1 is selected, and the relay 4' is energized when the desired selection is one of the other group of sixteen which includes the selection whereby the apparatus unit AU'—32 is selected.

If either the group relay 1' or 4' is energized when the relay R'—18 is energized at the termination of the last impulse of the select code a finder switch 1—F" and either finder switch 2—F", or 5—F", depending upon which group relay is energized, are operated at the remote station to positions corresponding to the combination in which the relays R'—7, R'—8, R'—10, R'—11, R'—13, R'—14, R'—16, and R'—17 are energized as a result of the last four impulses of the select code. The finder switches 1—F", 2—F", and 5—F" are similar in construction to the finder switches 1—F and the code sender 1—S at the dispatcher's office in that each of these switches is a rotary selector switch including six banks of twenty-five contacts. Normally, each of these finder switches at the remote station is in its zero position. When the group relay 1' is energized in response to the first two impulses of the select code, the subsequent energization of relay R'—18 at the termination of the last impulse of the select code causes the finder switch 1—F' to move to a position corresponding to the selection effected by the last four impulses of the select code and also causes the finder switch 2—F' to move to a corresponding position. When the common group relay 5' is energized in response to the first two impulses of the select code, the subsequent energization of relay R'—18 causes the finder switches 1—F' and 5—F' respectively to move to positions corresponding to the selection effected by the last four impulses of the select code. In the arrangement shown, the last four impulses of the select code are arranged to energize the relays R'—7, R'—8, R'—10, R'—11, R'—13, R'—14, R'—16, and R'—17 in sixteen different combinations and each of these sixteen combinations is arranged to complete suitable circuits through corresponding contacts in corresponding banks of the finder switches 1—F', 2—F', and 5—F'. For example, the select code transmitted in response to the operation of the select key SK—1 effects the sequential energization of the relays R'—7, R'—10, R'—13, and R'—16, so that a circuit is completed through certain contacts of these four relays in series to contact 1 in banks 1—F'2, 2—F'2, and 5—F'2 to stop the finder switches in this particular position. Similarly the select code transmitted in response to the operation of the select key SK—32 is arranged to effect the sequential energization of the relays R'—8, R'—11, R'—14, and R'—17 so that a circuit is completed through certain contacts of these relays in series to contacts 16 in the banks 1—F'2, 2—F'2, and 5—F'2 to stop the finder switches in this particular position.

As soon as the finder switches 1—F' and 2—F' or 1—F' and 5—F' have reached the positions corresponding to the selection that has been established by the select code, a code sender 1—S', which is similar in construction to the code sender 1—S at the dispatcher's office is started to transmit to the dispatcher's office over the two line conductors L—1 and L—2 a check code which is individual to the selection that has been established. In the arrangement shown this check code consists of a series of six positive and negative impulses and is set up by the energized group relay and the position in which the finder switch 1—F' stops and preferably is the same as the corresponding select code.

Normally, the code sender 1—S' is in its zero position and when the finder switch 1—F' stops in a position corresponding to an established selection the operating magnet 1—S'M' of the code sender 1—S' is operated to move the code sender 1—S' to its position 14. During this operation of the code sender 1—S', a circuit is completed in its positions 2, 4, 6, 8, 10 and 12 for either the relay P' or the relay N', depending upon the position of the finder switch 1—F' and upon which group relay is energized at the remote station. The relay P', when energized, is arranged to cause a positive impulse to be transmitted over the line conductors L—1 and L—2, and the relay N', when energized, is arranged to cause a negative impulse to be transmitted over the line conductors L—1 and L—2. In this manner, a series of six positive and negative impulses permutated individual to the selection which has been established is transmitted to the dispatcher's office. Also when the sender 1—S' reaches its position 14 either the relay P' or N' is energized in a manner hereinafter described to effect the transmission over the line conductors L—1 and L—2 of either a positive or a negative impulse, depending upon the position of the apparatus unit which has been selected.

At the dispatcher's office, each of the impulses of the check code energizes a polarized relay L so that it effects the energization of a relay LP in response to a positive impulse and a relay LN in response to a negative impulse. The relays LP and LN are so connected that the first impulse of the check code effects the energization of either the relay R—1 or R—2, depending upon the polarity of this impulse. At the termination of this first impulse, relay R—3 is energized to transfer the connections so that the second impulse of the check code effects the energization of either the relay R—4 or R—5, depending upon the polarity of the second impulse. At the termination of the second impulse, relay R—6 is energized to transfer the connections so that the third impulse of the check code effects the operation of either the relay R—7 or R—8, depending upon the polarity of the third impulse. In a similar manner, the relays R—9, R—12, R—15, and R—18 are respectively energized at the end of the third, fourth, fifth, and sixth impulses of the check code and either the relay R—10 or R—11 is energized in response to the fourth impulse, and either the relay R—13 or R—14 is energized in response to the fifth impulse, and either the relay R—16 or R—17 is energized in response to the last impulse of the check code.

When the relay R—18 is energized at the termination of the last impulse of the check code, it effects the momentary opening of certain holding circuits which had previously been established for the energized group relay and the finder switches 1—F and 2—F at the dispatcher's office. However, if the check code agrees with the select code that has previously been transmitted, the relays R—1, R—2, R—4, and R—5 are energized in the proper combination to establish a substitute holding circuit for the energized group relay and the relays R—7, R—8, R—10, R—11, R—13, R—14, R—16, and R—17 are also energized in the proper combination to establish substitute holding circuits for the finder switches 1—F and 2—F during the momentary interval that the original holding circuit is interrupted. Also, if the check code agrees with the select code, the amber light associated with the operated select key is lighted to inform the dispatcher that the desired selection has been made. Also the necessary circuit connections are established at the dispatcher's office so that the dispatcher can operate the selected apparatus unit by operating his operating keys MCK and MTK.

The indication impulse which follows the check code operates either the relay R—19 or the relay R—20, depending upon the polarity of the indication impulse and whichever of these two relays is energized effects the energization of the indicating relay associated with the operated select key so that the indicating lamps associated therewith indicate the proper position of the selected apparatus unit.

The energization of either of the relays R—19 or R—20 in response to the indication impulse also effects the energization of either the relay P or the relay N to cause an indication check impulse of the same polarity as the indication impulse to be transmitted over the line conductors L—1, L—2 to the remote station. This indication check impulse effects the operation of either the relays R'—19 and R'—21 or the relays R'—20 and R'—21 to establish the necessary circuits at the remote station so that the selected apparatus unit can be operated by the dispatcher.

The dispatcher can now operate the selected apparatus unit by operating either the master close key MCK or the master trip key MTK. The operation of the master close key MCK effects the energization of the relay N so that a negative impulse is transmitted over the line conductors L—1 and L—2 to the remote station where this negative impulse effects the energization of the relay R'—23 to complete the necessary circuits to effect the closing operation of the selected apparatus unit. The operation of the master trip key MTK effects the energization of the relay P to cause a positive impulse to be transmitted over the line conductors L—1 and L—2 to the remote station where this positive impulse effects the energization of the relay R'—22 so as to complete the necessary circuits to effect the tripping operation of the selected apparatus unit. The operation of the selected apparatus unit deenergizes either relay R'—19 or R'—20, depending upon which is energized, and thereby prepares the necessary circuit so that when relay R'—22, or R'—23 is deenergized at the termination of the control impulse, a new indication impulse corresponding to the new position of the selected apparatus unit is sent over the line conductors L—1 and L—2 to cause the indicating lamps associated with the operated select key to indicate the new position of the selected apparatus unit. Immediately after this new indication impulse is received at the dispatcher's office, the equipment thereat promptly sends back to the remote station an indication check impulse in the same manner as above described to energize either relay R'—19 or R'—20.

The dispatcher may operate the selected apparatus unit as many times as desired, without releasing the selection, by operating the master operate keys MCK and MTK. After each operation of the apparatus unit an indication impulse is transmitted to operate the corresponding signaling lamps to indicate the new position of the selected apparatus unit and an indication check impulse is transmitted to operate either relay R'—19 or R'—20 to reestablish the proper connections at the remote station.

After the last operation of the selected apparatus unit is performed, the dispatcher may release the selection and restore the apparatus to normal merely by restoring the operated select key to its normal position. In resetting, the equipment at the dispatcher's office sends a short impulse of a polarity corresponding to that of the last indication impulse received and this impulse effects the necessary connections at the substation to reset the apparatus thereat.

After the substation equipment resets, it applies normal line current which in turn completes the final resetting of the dispatcher's office equipment.

A detailed description of the operation of the system shown in the drawings is as follows: With the system at rest and in operative condition, the finder switches 1—F and 2—F are stopped in their position 17, the code sender 1—S is stopped in its position 0, the finder switch 1—F' is stopped in its position 17, the finder switches 2—F' and 5—F' are stopped in their position 0 and the code sender 1—S' is stopped in its position 16. Under these conditions at the dispatcher's office, a circuit for the relay N—1 is completed from the positive terminal of a suitable source of current such as the battery B, winding of relay N—1, conductor 100, contact 17 and wiper of bank 1—F2, conductor 101, winding of operating magnet 1—FM to the negative terminal of battery B. The current in this circuit is sufficient to operate the relay N—1 but is not sufficient to operate the magnet 1—FM. A circuit is also completed from the positive terminal of battery B through the winding of relay N—2, conductor 102, contacts 17 and wiper of bank 2—F2, conductor 103, winding of operating magnet 2—FM to the negative terminal of battery B. The current in this circuit is sufficient to operate the relay N—2 but is not sufficient to operate the magnet 2—FM. A circuit is also completed from the positive terminal of battery B through the winding of relay N—3, conductor 104, contacts b of relay H, conductor 106, contact 0 and wiper of bank 1—S4 to the neutral terminal of battery B. Therefore, with the system at rest, the relays N—1, N—2, and N—3 are energized at the dispatcher's office.

At the remote station a circuit is completed from the positive terminal of a suitable source of current such as the battery B' through the winding of relay N'—1, contacts 17 and wiper of bank 1—F"2, conductor 300, winding of operating magnet 1—F"M' to the negative terminal of battery B'. The current in this circuit is sufficient to operate relay N'—1 but not sufficient to operate magnet 1—F"M'. A circuit is also completed from the positive terminal of battery B' through the upper winding of the relay N'—2, contacts a of relay N'—2, conductor 301, and contacts b of relay 1' to the neutral terminal of the battery to maintain the relay N'—2 in its energized position. A circuit is also completed from the positive terminal of battery B' through the upper winding of relay N'—5, contacts a of relay N'—5, conductor 302, contacts b of relay 4' to the neutral terminal of battery B so as to maintain the relay N'—5 in its energized position. Since relays N'—1, N'—2, and N'—5 are all energized, thereby indicating that the switches 1—F', 2—F', and 5—F' are respectively in their normal positions, a circuit is completed for the relay N'O' from the negative terminal of battery B' through the contacts c of relay N'—2, conductor 303, contacts c of relay N'—5, conductor 304, winding of relay N'O', conductor 305, contacts a of relay N'—1, conductor 306, contacts d of relay R'L', conductor 400, contact 16 and wiper of bank 1—S'2 to the neutral terminal of battery B'. A check circuit is also completed from the neutral terminal of battery B' through contacts c of relay N'O', conductor 307, contacts 16 and wiper of bank 1—S'3, conductor 308, contacts b of relay N', line conductor L—2, contacts b of relay N, conductor 107, contacts 0 and wiper of bank 1—S6, conductor 108, contacts a of emergency reset key ERK, conductor 109, operating winding of polarized relay L, conductor 110, contacts b of relay P, line conductor L—1, contacts b of relay P', conductor 309, operating winding of polarized relay L', conductor 310, contacts a of relay N'O' to the negative terminal of battery B'. The current in this circuit is in the proper direction to cause the polarized relays L and L' to close their respective contacts a. An energizing circuit is therefore completed from the neutral of battery B through the contacts a of the relay L, conductor 111, contacts b of relay LP, conductor 112, operating winding of relay LN to the negative terminal of battery B. A similar energizing circuit is completed for the relay L'P' at the remote station from the neutral of battery B' through contacts a of relay L', conductor 311, winding of relay L'P', conductor 312, contacts b of relay L'N' to the positive terminal of battery B'. Through its contacts e, relay L'P' completes an energizing circuit for the relay R'O' from the positive terminal of battery B' through the contacts e of relay L'P', conductor 314, contacts b of relay R'L', conductor 406, winding of relay R'O' to the negative terminal of battery B'. The contacts a of the energized relay LN complete a circuit from the positive terminal of battery B through contacts d of relay RC, conductor 113, contacts a of relay LN, conductor 114, contacts b of relay RL, conductor 200, winding of relay RO to the negative terminal of battery B. Through the contacts c of the energized relay RO, a circuit is completed for the start light STL from the positive terminal of the battery through the start light STL, conductor 116, contacts c of the relay RO, conductor 201, contacts d of relay RL, conductor 202, contacts h of relay C—3, conductor 117, contacts c of relay N—1, conductor 118, contacts c of relay N—2, conductor 119, contacts c of relay N—3, conductor 120, contacts b of relay RC to the negative terminal of battery B. The lighting of the start lamp STL informs the operator that the equipment is at rest in its normal position.

At the remote station the relays D'—2, D'—3, D'—4, D'—5 are also energized. The circuit of the relay D'—2 includes the conductor 401 and the contacts j of relay R'—3. The circuit of the relay D'—3 includes the conductor 402 and the contacts h of the relay R'—3. The energizing circuit for the relay D'—4 includes the conductor 403, contacts a of relay D'—3, conductor 404, and the contacts a of relay D'—2. A locking circuit for the relay D'—4 is also completed through the contacts a of the relay D'—4 so that after it is once energized it remains energized as long as the voltage of the control source B' remains above a predetermined value.

In order to describe the operation of the arrangement shown, it will be assumed that the apparatus unit AU'—32 is open and that the dispatcher desires to close this apparatus unit. After first observing that the start lamp STL is lighted, the dispatcher then operates the select key SK—32, which is individual to the apparatus unit AU'—32, so as to close the contacts a and c of the select key. The closing of the contacts c of the select key SK—32 completes a circuit from the positive terminal of battery B through the contacts a of relay N—3, conductor 121, contacts a of relay N—2, conductor 122, contacts a of relay N—1, conductor 123, contacts b of relay 1, conductor 124, winding of relay 4, conductor 125, contacts c of select key SK—32, conductor 126, contacts d of relay C—1 to the neutral of battery B. By closing its contacts a, relay 4 completes a locking circuit for itself from the positive terminal of battery B to conductor 123. By closing its contacts k, relay 4 completes a circuit from the neutral of battery B through contacts k of relay 4, conductor 133, winding of relay H to the positive terminal of battery B. Relay H, by opening its contacts b, effects the deenergization of the relay N—3, and by closing its contacts a, completes a locking circuit for itself through conductor 134 and contacts f of relay D. By closing its contacts e, relay 4 completes a circuit from the positive terminal of battery B through the contacts e of relay 4, conductor 127, contacts b of relay R—3, conductor 203, contacts 17 and wiper of bank 2—F1, conductor 128, contacts b of magnet 2—FM, conductor 103, winding of magnet 2—FM to the negative terminal of battery B. A similar circuit is connected from conductor 203 through contacts 17 and wiper of bank 1—F1, conductor 129, contacts b of magnet 1—FM, conductor 101, winding of magnet 1—FM to the negative terminal of battery B. Since the full potential of battery B is now applied to the operating magnets 1—FM and 2—FM, they are sufficiently energized to open their respective contacts b and thereby effect the interruption of the circuits just described so that the switches 1—F and 2—F are moved from position 17 to position 18. Since all of the contacts in bank 1—F1, except contact 17, and all of the contacts in bank 2—F1, except contacts 17, are connected through directly to the positive terminal of battery B, the magnets 1—FM and 2—FM are intermittently energized to move the switches 1—F and 2—F to the position corresponding to the operated select key SK—32, which in the particular arrangement shown in the drawing is position 16. When the finder switch 1—F1 reaches its position 16, a holding circuit is completed for the operating magnet 1—FM from the negative terminal of battery B to the operating winding of the magnet 1—FM, conductor 101, wiper and contact 16 of bank 1—F2, conductor 129', contacts a of the operated select key SK—32, conductor 130, contacts b of relay C—1, conductor 204, contacts b of relay C—3, conductor 127, and contacts e of relay 4 to the positive terminal of battery B. This circuit maintains the magnet 1—FM energized so as to stop the switch 1—F in its position 16. A similar circuit is completed for the operating magnet 2—FM through the wiper and contacts 16 of switch 2—F2 when the finder switch 2—F reaches its position 16.

In positions 1 to 16 of the switch 1—F, a circuit is completed through the wiper of bank 1—F6, conductor 131, contacts f of relay RC, conductor 206, winding of relay S—1 to the neutral of battery B. Since adjacent contacts of the bank 1—F6 are connected to opposite terminals of the battery, the rapid reversals of current through the winding of relay S—1 while the finder switch 1—F is moving from position 1 to position 16 prevent the relay S—1 from picking up during this operation. After the switch 1—F stops in position 16 however, the relay S—1 picks up. By closing its contacts a, relay S—1 completes a starting circuit for the code sender 1—S from the positive terminal of battery B through the contacts b of the operating magnet 1—SM, wiper and contact 0 of bank 1—S1, conductor 132, contacts a of relay S—1, conductor 207, contacts f of relay RL, conductor 208, winding of operating magnet 1—SM to the negative terminal of battery B.

By opening its contacts b, the magnet 1—SM opens its own energizing circuit so that the magnet becomes deenergized and moves the code sender 1—S to its position 1. In positions 1, 2, and 3 of the code sender 1—S, a notching circuit is completed for the magnet 1—SM through its contacts b, wiper of bank 1—S1, conductor 208, and winding of magnet 1—SM so as to cause the code sender 1—S to move to position 4. In positions 4—16 of sender 1—S a circuit is completed for a relay T—1 through contacts b of the magnet 1—SM and wiper of bank 1—S1. Relay T—1, by closing its contacts a, completes an energizing circuit for the magnet 1—SM, which, in turn, by opening its contacts b, interrupts the energizing circuit of the relay T—1. Therefore a notching circuit is completed for the magnet 1—SM to move the switch 1—S from position 4 to position 17, and during this movement the code sender effects the transmission, over the line conductors L—1 and L—2, of the select code which has been set up by the energized group relay 4 and the position of the finder switch 1—F. The polarity of the first two impulses of the select code is determined by the energized group relay and the next four impulses of the select code are determined by the position of the finder switch 1—F. Since the group relay 4 is energized and the finder switch 1—F is in its position 16 as a result of the operation of the select key SK—32, the following circuits are completed as the code sender 1—S moves from position 4 to position 16.

When the code sender reaches position 5, a circuit is completed for the relay N from the positive terminal of battery B through the winding of relay N, conductor 135, wiper and contact 5 of bank 1—S3, conductor 136, contacts g of relay 4 to the negative terminal of battery B. Relay N, by closing its contacts a, connects the negative terminal of battery B to the line conductor L—1 and by closing its contacts c connects the neutral of battery B to the line L—2 so that a negative impulse is transmitted over the line conductors L—1 and L—2 to the remote station. When the code sender 1—S reaches position 7 a circuit is completed for the relay N from the positive terminal of battery B through the winding of relay N, conductor 135, wiper and contact 7 of bank 1—S3, conductor 137, contacts i of relay 4 to the negative terminal of battery B. Therefore, the relay N is again energized to effect the transmission of another negative impulse to the remote station. When the code sender 1—S reaches position 9, another circuit is completed for the relay N to effect the transmission of another negative impulse to the remote station. This energizing circuit of relay N includes the conductor 135, wiper and contact 9 of bank 1—S3, conductor 138, and wiper and contact 16 of bank 1—F3. When the code sender reaches position 11, another circuit is completed for the relay N through wiper and contact 11 of bank 1—S3, conductor 139, and wiper and contact 16 of bank 1—F4 so as to effect the transmission of another negative impulse to the remote station. When the code sender 1—S reaches position 13, another circuit is completed for the relay N through the wiper and contact 13 of bank 1—S3, conductor 140, and wiper and contact 16 of bank 1—F5, so that another negative impulse is transmitted to the remote station. When code sender 1—S reaches position 15, another energizing circuit is completed for relay N through the wiper and contact 15 of bank 1—S3, conductor 131, and wiper and contact 16 of bank 1—F6 so that the relay N is again energized to effect the transmission of another negative impulse to the remote station. Therefore, as a result of the operation of the code sender 1—S a series of six negative impulses is transmitted to the remote station to effect the selection of the apparatus unit AU'—32.

As soon as the code sender 1—S leaves its position 0 the heretofore traced check circuit through the line conductors L—1 and L—2 and the polarized relays L and L' is opened by the wiper of bank 1—S6 leaving its normal contact. The opening of this check circuit causes the relay L at the dispatcher's office to open its contacts a and thereby effect the deenergization of the relay LN. By opening its contacts a, the relay LN removes a short-circuit from around the winding of the relay RL so that this relay is energized in series with the relay RO. This series circuit is from the negative terminal of battery B through the winding RO, conductor 200, contacts a of relay RO, conductor 209, winding of relay RL, conductor 210, contacts 1 of relay D to the positive terminal of battery B.

At the remote station the opening of the normal check circuit causes the relay L' to open its contacts a and thereby effect the deenergization of the relay L'P'. By opening its contacts e, relay L'P' removes a short-circuit from around the winding of the relay R'L' so that this relay is energized in series with the winding of relay R'O'. This circuit is from the positive terminal of battery B' through contacts h of relay D'—1, conductor 407, winding of relay R'L, conductor 408, contacts e of relay R'O', conductor 406, winding of relay R'O' to the negative terminal of battery B'. By opening its contacts d, relay R'L' interrupts the heretofore traced circuit for the relay N'O'. By opening its contacts a and c and closing its contacts b, relay N'O' changes the connections of the line conductors L—1 and L—2 at the remote station so that the circuit of the polarized relay L' is from the line conductor L—1 through the contacts b of relay P', conductor 309, winding of relay L', conductor 310, contacts b of relay N'O', conductor 307, wiper and contact 16 of bank 1—S'3, conductor 308, contacts b of relay N' to line conductor L—2.

When the first impulse of the select code is received at the remote station, the negative impulse flows through the winding of the relay L' and causes this relay to close its contacts b, thereby completing an energizing circuit for the relay L'N' through conductor 315, contacts b of relay L'P', conductor 316, and winding of relay L'N'. By closing its contacts e, relay L'N' completes an energizing circuit for relay R'—2 from the positive terminal of battery B' through the contacts e of relay L'N', conductor 317, contacts d of relay R'—3, conductor 500, contacts c of relay R'L', conductor 318, winding of relay R'—2 to the negative terminal of battery B'. When the first impulse is removed from the line conductors, the relays L' and L'N' become deenergized so that the relay R'—3 is energized in series with the relay R'—2. This series circuit is from the positive terminal of battery B' through contacts h of relay D'—1, conductor 407, winding of relay R'—3, conductor 501, contacts a of relay R'—2, conductor 318, winding of relay R'—2 to the negative terminal of battery B'. The energization of the relay R'—3 transfers the connection so that the second impulse of the select code selectively controls the relays R'—4 and R'—5 instead of the relays R'—1 and R'—2.

Since the second impulse of the select code is also a negative impulse, it effects the energization of the relays L' and L'N' in the manner above-described. By closing its contacts e, the relay L'N' now completes a circuit through conductor 317, contacts c of relay R'—3, conductor 502, contacts b of relay R'—6, conductor 503, winding of relay R'—5 to the negative terminal of the battery. When this second impulse is removed from the line wires, a series circuit is completed for the relays R'—5 and R'—6 from the positive terminal of battery B' through contacts h of relay D'—1, conductor 407, winding of relay R'—6, conductor 504, contacts a of relay R'—5, conductor 503, winding of relay R'—5 to the negative terminal of battery B'. The energization of the relay R'—6 in series with the relay R'—5 transfers the connections so that the third impulse of the select code selectively controls the relays R'—7 and R'—8.

Since the third impulse is a negative impulse, the relays L' and L'N' are again energized and the relay L'N', by closing its contacts e, completes an energizing circuit for the relay R'—8 through the conductor 317, contacts b of relay R'—9, conductor 505, contacts b of R'—6, conductor 506, and winding of relay R'—8. When the third impulse is removed from the line conductors, a series circuit is completed through the winding of relays R'—8 and R'—9 from the positive terminal of battery B' through contacts h of relay D'—1, conductor 407, winding of relay R'—9, conductor 507, contacts a of relay R'—8, conductor 506, winding of relay R'—8 to the negative terminal of battery B'. The energization of the relay R'—9 transfers the connections so that the fourth impulse of the select code selectively controls the relays R'—10 and R'—11.

Since the fourth impulse of the select code is a negative impulse, the relays L' and L'N' are again energized and relay L'N', by closing its contacts e, completes an energizing circuit for the relay R'—11 through conductor 317, contacts a of relay R'—9, conductor 508, contacts b of relay R'—12, conductor 509, and winding of relay R'—11. When the fourth impulse is removed from the line conductors, a series energizing circuit is completed through the windings of relays R'—11 and R'—12 from the positive terminal of battery B' through contacts h of relay D'—1, conductor 407, winding of relay R'—12, conductor 510, contacts a of relay R'—11, conductor 509, winding of relay R'—11 to the negative terminal of battery B'. The energization of the relay R'—12 transfers the connection so that the fifth impulse of the select code selectively controls the relays R'—13 and R'—14.

Since the fifth impulse of the select code is a negative impulse, the relays L' and L'N' are again energized and relay L'N', by closing its contacts e, completes an energizing circuit for the relay R'—14 through conductor 317, contacts a of relay R'—12, conductor 511, contacts d of relay R'—15, conductor 512, and winding of relay R'—14. When the fifth impulse is removed from the line conductors a series energizing circuit is completed for the windings of relays R'—14 and R'—15 from the positive terminal of battery B' through the contacts h of relay D'—1, conductor 407, winding of relay R'—15, conductor 513, contacts a of relay R'—14, conductor 512, winding of relay R'—14 to the negative terminal of battery B'. The energization of the relay R'—15 transfers the connections so that the sixth impulse of the select code selectively controls the relays R'—16 and R'—17.

Since the sixth impulse of the select code is also a negative impulse, the relays L' and L'N' are again energized and the relay L'N', by closing its contacts e, completes an energizing circuit for the relay R'—17 through conductor 317, contacts b of relay R'—18, conductor 514, contacts a of relay R'—15, conductor 515, and winding of relay R'—17. When the sixth impulse is removed from the line conductors, a series energizing circuit is completed for the winding of relays R'—17 and R'—18 from the positive terminal of battery B' through contacts h of relay D'—1, conductor 407, winding of relay R'—18, conductor 516, contacts a of relay R'-17, conductor 515, winding of relay R'—17 to the negative terminal of the battery.

Therefore, as a result of the select code, relays R'—2, R'—3, R'—5, R'—6, R'—8, R'—9, R'—11, R'—12, R'—14, R'—15, R'—17, and R'—18 are energized. When the relay R'—3 is energized in response to the removal of the first impulse of the select code, a circuit is completed for the relay C'—3 from the positive terminal of battery B' through the winding of the relay C'—3, conductor 412, contacts h of relay S'—1, conductor 324, contacts e of relay R'—3, conductor 518, contacts f of relay D'—1 to the neutral terminal of battery B'. By closing its contacts e, relay C'—3 completes a locking circuit for itself.

As a result of the energization of relays R'—2 and R'—5, an energizing circuit is completed for the group relay 4' and the relay 5' from the positive terminal of battery B' through the winding of relay 5', conductor 320, contacts b of relay D'—1, conductor 409, contacts h of relay 1', conductor 321, winding of relay 4', conductor 322, contacts c of relay R'—5, conductor 517, contacts c of relay R'—2, conductor 411, contacts a of relay C'—3, conductor 304, contacts c of relay N'—5, conductor 303, contacts c of relay N'—2 to the negative terminal of battery B'. By closing its contacts a, relay 5' completes a locking circuit for the relays 4' and 5' by connecting the conductor 411 to the negative terminal of battery B'. By opening its contacts b, the relay 4' interrupts the heretofore described holding circuit for the relay N'—5 so that this relay becomes deenergized.

When relay R'—3 becomes energized, the opening of its contacts j interrupts the heretofore described circuit for relay D'—2 and the opening of its contacts h interrupts the heretofore described circuit for relay D'—3.

During the receipt of the select code, however, the slow-to-operate relays D'—2 and D'—3 remain in their energized positions if the select impulses are received correctly. During the time that the select impulses are removed from the line conductors so that relays N', P', L'N', and L'P' are simultaneously deenergized, an energizing circuit is completed for relay D'—2 from conductor 401 through contacts d of relay N', conductor 361, contacts d of relay P', conductor 362, contacts f of relay L'N', conductor 363, contacts f of relay L'P' to the neutral of battery B'. The length of the time that a select impulse is being transmitted is not long enough normally to allow the relay D'—2 to return to its normal position. When the relay R'—18 is energized at the termination of the sixth impulse, its contacts k connect the conductor 401 to the neutral of battery B', thereby maintaining the relay D'—2 energized as long as the relay R'—18 remains energized.

During the time that each select impulse is being transmitted, a circuit is completed for relay D'—3 from conductor 402 to the neutral of battery B' through contacts c of relay L'N' if the select impulse is negative and through contacts c of relay L'P' if the select impulse is positive. The length of time between successive select impulses is not long enough normally to allow the relay D'—3 to return to its normal position. When the relay R'—18 is energized at the termination of the select code, its contacts i connect the conductor 402 to the neutral of battery B', thereby maintaining the relay D'—3 energized as long as the relay R'—18 remains energized.

If for any reason the select code is not properly received at the remote station, either the relay D'—2 or D'—3 will drop out and will effect, in a manner hereinafter described, a reset of the equipment.

Since the relays R'—8, R'—11, R'—14, and R'—17 are energized by the select code, a circuit is completed from the positive terminal of battery B' through contacts $i$ of relay 4', conductor 325, contacts $c$ of relay R'—8, conductor 520, contacts $e$ of relay R'—11, conductor 521, contacts $c$ of relay R'—14, conductor 522, contacts $c$ of relay R'—17, conductor 523 to contact 16 of bank 5—F'1 and to contact 16 of bank 1—F'2.

When relay R'—18 becomes energized at the termination of the last impulse of the select code, a circuit is completed from the positive terminal of battery B', winding of relay C'—1, conductor 458, contacts $g$ of relay R'—18, conductor 518, contacts $f$ of relay D'—1 to the neutral of battery B'. By closing its contacts $a$, relay C'—1 completes a circuit from the neutral of battery B' through contacts $a$ of relay C'—1, conductor 459, contacts $d$ of relay D'—1, conductor 460, winding of relay C'—2 to the positive terminal of battery B'.

By closing its contacts $e$, relay R'—18 completes a circuit from the positive terminal of battery B' through contacts $e$ of relay R'—18, conductor 524, contacts $b$ of relay C'—4, conductor 413, contacts $e$ of relay N'—2, conductor 365, contacts $d$ of relay N'—5, conductor 326, contacts $b$ of magnet 5—F'M', conductor 327, winding of magnet 5—F'M' to the negative terminal of battery B'. Since the contacts $b$ of the magnet 5—F'M' are in this circuit, the magnet is intermittently energized and deenergized to move the finder switch 5—F' from its normal position to position 16, in which position a holding circuit for magnet 5—F'M is completed through the wiper and contact 16 of bank 5—F'1 to conductor 523 which, as previously described, is connected to the positive terminal of battery B' through the series connected contacts of relays R'—8, R'—11, R'—14, and R'—17.

The closing of the contacts $e$ of the relay R'—18 also completes a circuit from the positive terminal of battery B' through contacts $e$ of relay R'—18, conductor 524, contacts $c$ of relay 5', conductor 329, wiper and contact 17 of bank 1—F'1, conductor 330, contacts $b$ of magnet 1—F'M', conductor 300, winding of magnet 1—F'M' to the negative terminal of battery B'. Since the contacts $b$ of the magnet 1—F'M' are in this circuit, the magnet 1—F'M' is intermittently energized and deenergized to move the finder switch 1—F' from position 17 to its zero position and then to its position 16, in which position a holding circuit is completed for the magnet 1—F'M' through conductor 300, wiper and contact 16 of bank 1—F'2 to conductor 523, which, as previously described, is connected to the positive terminal of battery B' through the series connected contacts of the energized relays R'—8, R'—11, R'—14, and R'—17.

While the finder switch 1—F' is moving from position 1 to position 16, a circuit is completed for the relay S'—1 from the positive terminal of battery B' through the wiper and contacts 1, 3, 5, 7, 9, 11, 13, and 15 of bank 1—F'6, conductor 331, winding of relay S'—1 to the neutral terminal of battery B' and from the negative terminal of battery B' through the wiper and contacts 2, 4, 6, 8, 10, 12, 14, and 16, conductor 331, and winding of relay S'—1 to the neutral of battery B'. Due to the rapidity at which the finder switch 1—F' operates, the relay S'—1 does not operate until the switch stops in its position 16. By closing its contacts $g$, relay S'—1 completes a circuit from the neutral of battery B' through the contacts $g$ of relay S'—1, conductor 332, contacts 16 and wiper of bank 1—S'1, conductor 333, and contacts $b$ of magnet 1—S'M', conductor 334, winding of relay T'—1 to positive terminal of battery B'. Relay T'—1, by closing its contacts $a$, completes an energizing circuit for the operating magnet 1—S'M', which in turn, by opening its contacts $b$, interrupts the circuit of relay T'—1. Therefore, a notching circuit is completed for the magnet 1—S'M' to move the code sender 1—S' from its normal position 16 to its position 17. Since the contacts 17 to 24, inclusive, of bank 1—S'1 are connected directly to the neutral terminal of battery B', a notching circuit is completed for the operating magnet 1—S'M' to move the code sender from position 17 to position 0. When the code sender 1—S' reaches position 0, a circuit is completed for the relay T'—1 through the wiper and contact 0 of bank 1—S'1, conductor 335, and contacts $m$ of relay S'—1 to energize again the relay T'—1 and thereby complete a circuit for the magnet 1—S'M' so that the code sender 1—S' is moved from position zero to position 1. Since the contacts 1 to 13, inclusive, of the bank 1—S'1 are connected to the neutral terminal of battery B', a notching circuit is immediately completed for the operating magnet 1—S'M' to move the code sender 1—S' from position 1 to position 14.

As the code sender 1—S' moves from position 1 to position 14, it effects the transmission over the line conductors L—1 and L—2 of the check code which has been set up by the energized group relay 4' and the position of the finder switch 1—F'. In the arrangement shown, the check and select codes are identical so that the check code for the apparatus unit AU'—32 consists of six negative impulses.

When the code sender 1—S' is in position 2, a circuit is completed for the relay N' from the positive terminal of battery B' through the winding of the relay N', conductor 336, contacts $a$ of relay S'—1, conductor 337, wiper and contact 2 of bank 1—S'6, conductor 338, contacts $a$ of relay 4' to the negative terminal of battery B'. Relay N', by closing its contacts $a$, connects the neutral of battery B' to the line conductor L—2 and by closing its contacts $c$ connects the negative terminal of battery B' to the line conductor L—1 so that a negative impulse is transmitted over the line conductors while the relay N' is energized.

In position 4 of the code sender 1—S', a circuit is completed for the relay N' through conductor 336, contacts $a$ of relay S'—1, conductor 337, wiper and contact 4 of bank 1—S'6, conductor 339, and contacts $c$ of relay 4' so that another negative impulse is transmitted over the line conductors.

In position 6 of the code sender 1—S', another circuit is completed for the relay N' through the wiper and contacts 6 of bank 1—S'6, conductor 340, wiper and contact 16 of bank 1—F'3.

In position 8 of code sender 1—S', another circuit is completed for the relay N' through wiper and contact 8 of bank 1—S'6, conductor 341, wiper and contact 16 of bank 1—F'4.

In position 10 of the code sender 1—S', another circuit is completed for the relay N' through the wiper and contact 10 of bank 1—S'6, conductor 342, wiper and contact 16 of bank 1—F'5.

In position 12 of the code sender 1—S', another circuit is completed for the relay N' through the wiper and contact 12 of bank 1—S'6, conductor 331, wiper and contact 16 of bank 1—F'6.

When the code sender 1—S' reaches position 14, another impulse is transmitted over the line conductor L—1 and L—2 of a character corresponding to the position of the selected apparatus unit. When the relay S'—1 becomes energized in response to the stopping of finder switch 1—F', it completes a circuit for either the relay I'T' or the relay I'C', depending upon the position of the selected apparatus unit. Since in the arrangement shown in the drawings, the apparatus unit AU'—32 is assumed to be open, a circuit is completed by the relay S'—1 for the relay I'T' from the negative terminal of battery B' through winding of relay I'T', conductor 415, contacts b of relay I'C', conductor 416, contacts e of relay S'—1, conductor 343, wiper and contact 16 of bank 5—F'5, conductor 344, contacts b of the apparatus unit AU'—32, conductor 352, contacts d of relay SC to the positive terminal of battery B'. Therefore, when the code sender 1—S' reaches its position 14, a circuit is completed from the negative terminal of battery B' through the winding of the relay P', conductor 344', wiper and contacts 14 of bank 1—S'5, conductor 345, contacts a of relay I'T', conductor 417, contacts d of relay I'C', conductor 418, contacts b of relay S'—2, conductor 419, contacts c of relays C'—2 and C'—3 in parallel, conductor 420, contacts d of relay L'P', conductor 346, contacts d of relay L'N', conductor 347, wiper and contact 14 of bank 1—S'2 to the neutral of battery B'. Relay P', by closing its contacts a, connects the neutral of battery B' to the line conductor L—2 and by closing its contacts c connects the positive terminal of battery B' to the line conductor L—1 so that a positive indication impulse is transmitted to the dispatcher's office, thereby indicating that the selected apparatus unit AU'—32 is in its open position.

When the code sender 1—S' reaches its position 14 a circuit is also completed from the negative terminal of battery B' through contacts c of relay I'T', conductor 422, winding of relay S'—3, to conductor 419, which is connected to the neutral terminal of the battery, in the manner just described. After being energized for a predetermined length of time relay S'—3 closes its contacts a and completes through contacts c of relay I'T' and conductor 422 an energizing circuit for a time relay S'—2 which, after being energized for a predetermined time, opens at its contacts b the heretofore described circuit for the relay P' so as to remove the indication impulse from the line wires. By closing its contacts a, relay S'—2 connects the conductor 347 to the conductor 420, thereby completing a shunt circuit around the contacts b of the relays L'P' and L'N'.

Each of the negative check impulses flows through the polarized relay L at the dispatcher's office from line conductor L—2 through contacts b of relay N, conductor 107, wiper and contact 17 of bank 1—S6, conductor 108, contacts a of emergency reset key ERK, conductor 109, winding of polarized relay L, conductor 110, contacts b of relay P to the line conductor L—1. The current through the winding of relay L is in such a direction as to cause the relay to close its contacts a and thereby complete the heretofore described energizing circuit for the relay LN.

When relay LN is energized in response to the first impulse of the check code, a circuit is completed from the positive terminal of battery B through contacts d of relay RC, conductor 113, contacts a of relay LN, conductor 114, contacts c of relay RL, conductor 142, contacts b of relay R—3, conductor 211, winding of relay R—2 to the negative terminal of battery B. When the first impulse of the check code is removed from the line conductors so that relays L and LN are deenergized, a series energizing circuit is completed for the relays R—2 and R—3 from the positive terminal of battery B through contacts 1 of relay D, conductor 210, winding of relay R—3, conductor 212, contacts a of relay R—2, conductor 211, winding of relay R—2 to the negative terminal of battery B. The energization of relay R—3 transfers the connections so that the second impulse of the check code controls the energization of either the relay R—4 or the relay R—5.

When the second impulse of the check code effects the energization of the relays L and LN, a circuit is completed from the positive terminal of battery B through contacts d of relay RC, conductor 113, contacts a of relay LN, conductor 114, contacts c of relay R—3, conductor 213, contacts b of relay R—6, conductor 214, winding of relay R—5 to the negative terminal of battery B. When the second impulse is removed from the line conductors so that the relays L and LN become deenergized, a series energizing circuit is completed for the windings of relays R—5 and R—6 from the positive terminal of battery B through contacts 1 of relay D, conductor 210, winding of relay R—6, conductor 215, contacts a of relay R—5, conductor 214, winding of relay R—5 to the negative terminal of battery B. The energization of relay R—6 transfers the connections so that the third impulse of the check code effects the energization of either the relay R—7 or the relay R—8.

When the third impulse of the check code effects the energization of the relays L and LN, a circuit is completed from the positive terminal of battery B through the contacts d of relay RC, conductor 113, contacts a of relay LN, conductor 114, contacts d of relay R—9, conductor 216, contacts c of relay R—6, conductor 217, winding of relay R—8 to the negative terminal of battery B. When the third impulse is removed from the line conductors so that the relays L and LN are deenergized a series energizing circuit is completed through the windings of relays R—8 and R—9 from the positive terminal of battery B through contact 1 of relay D, conductor 210, winding of relay R—9, conductor 218, contacts a of relay R—8, conductor 217, winding of relay R—8 to the negative terminal of battery B. The energization of the relay R—9 transfers connections so that the fourth impulse of the check code effects the energization of the relay R—10 or R—11.

When the fourth impulse of the check code effects the energization of the relays L and LN, a circuit is completed from the positive terminal of battery B through contacts d of relay RC, conductor 113, contacts a of relay LN, conductor 114, contacts c of relay R—9, conductor 219, contacts b of relay R—12, conductor 220, winding of relay R—11 to the negative terminal of battery B. When the fourth impulse of the check code is removed from the line conductors, a series energizing circuit is completed for the windings of relay R—11 and R—12 from the positive terminal of the battery through contacts 1 of relay D, conductor 210, winding of relay R—12, conductor 221, contacts e of relay R—11, conductor 220, winding of relay R—11 to the negative terminal of battery B. The energization of the relay R—12 transfers the connections so that the fifth impulse of the check code effects the energization of the relay R—13 or the relay R—14.

When the fifth impulse of the check code effects the energization of the relays L and LN, a circuit is completed from the positive terminal of battery B through contacts d of relay RC, conductor 113, contacts a of relay LN, conductor 114, contacts a of relay R—12, conductor 222, contacts b of relay R—15, conductor 223, winding of relay R—14 to the negative terminal of battery B. When the fifth impulse of the check code is removed from the line conductors so that the relays L and LN become deenergized a series energizing circuit is completed for the windings of relays R—14 and R—15 from the positive terminal of battery B through contacts 1 of relay D, conductor 210, winding of relay R—15, conductor 224, contacts i of relay R—14, conductor 223, winding of relay R—14 to the negative terminal of battery B. The energization of the relay R—15 transfers the connections so that the sixth and last impulse of the check code effects the energization of the relay R—16 or the relay R—17.

When the sixth impulse of the check code effects the energization of the relays L and LN, a circuit is completed from the positive terminal of battery B through contacts d of relay RC, conductor 113, contacts a of relay LN, conductor 114, contacts b of relay R—18, conductor 225, contacts a of relay R—15, conductor 226, winding of relay R—17 to the negative terminal of battery B. When the sixth impulse is removed from the line conductors so that the relays L and LN are deenergized a series energizing circuit is completed through the windings of the relays R—17 and R—18 from the positive terminal of battery B through contacts 1 of relay D, conductor 210, winding of relay R—18, conductor 227, contacts a of relay R—17, conductor 226, winding of relay R—17 to the negative terminal of battery B. The energization of the relay R—18 transfers the connections so that the indication impulse effects the energization of either the relay R—19 or the relay R—20.

If the select and check codes agree, a secondary holding circuit is completed for the relay 4 by the relays R—2 and R—5 and a secondary holding circuit is completed for the operating magnets 1—FM and 2—FM through contacts of the energized relays R—8, R—11, R—14, and R—17. The secondary holding circuit for the relay 4 is from positive terminal of battery B through contacts a of relay 4, conductor 123, contacts b of relay 1, conductor 124, winding of relay 4, conductor 125, contacts c of relay R—5, conductor 228, contacts c of relay R—2, conductor 229, contacts b of relay S—2 to the neutral of battery B. The secondary holding circuit for the magnet 1—FM is from the negative terminal of battery B through winding of the magnet 1—FM, conductor 101, wiper and contact 16 of bank 1—F2, conductor 129', contacts f of relay R—17, conductor 230, contacts a of relay R—14, conductor 231, contacts a of relay R—11, conductor 232, contacts c of relay R—8, conductor 127, contacts e of relay 4 to the positive terminal of battery B. A similar secondary holding circuit is completed for the magnet 2—FM from the negative terminal of battery B through the winding of the magnet 2—FM, conductor 103, wiper and contact 16 of bank 2—F2 to conductor 129' which is connected to the positive terminal of battery B in the manner above described.

When the relay R—18 becomes energized, when the last impulse of the check code is removed from the line conductors L—1 and L—2, a circuit is completed from the neutral of battery B through contacts c of relay R—18, conductor 233, winding of relay C—1 to the negative terminal of battery B. Relay C—1, by opening its contacts d, interrupts the original holding circuit for the relay 4 so that if the secondary holding circuit for this relay has not been completed by the energization of the relays R—2 and R—5, relay 4 becomes deenergized. By opening its contacts b, relay C—1 interrupts the original holding circuits for the magnets 1—FM and 2—FM so that if the secondary holding circuits for these magnets have not been completed in response to the transmission of the proper check code, these magnets are deenergized to effect the movement of their respective switches to their next position, so as to effect in a manner hereinafter described a release of the selection. If the check code agrees with the select code, the secondary holding circuits heretofore described maintain the magnets 1—FM, 2—FM, and the relay 4 energized after the relay C—1 operates and the time relay C—2 operates to close its contacts and thereby reestablish the original holding circuits for the magnets 1—FM, 2—FM, and the group relay 4. The energizing circuit for the relay C—2 is from the positive terminal of battery B through the winding of the relay C—2, conductor 235, contacts b of relay D, conductor 236, contacts c of relay C—1 to the neutral of battery B. Relay C—2, by closing its contacts c, completes a shunt circuit around the contacts b of relay C—1 in the original holding circuits for the magnets 1—FM and 2—FM and by closing its contacts e completes a shunt circuit around the contacts d of the relay C—1 in the original holding circuit for the relay 4.

When the indication impulse which follows the check code is a positive impulse, it causes the polarized relay L at the dispatcher's office to close its contacts b and thereby complete an energizing circuit for the relay LP from the negative terminal of battery B through the winding of the relay LP, conductor 144, contacts b of relay LN, conductor 145, contacts b of relay L to the neutral of battery B. By closing its contacts a, relay LP completes a circuit from the positive terminal of battery B through the contacts d of relay RC, conductor 113, contacts a of relay LP, conductor 146, contacts g of relay R—18, conductor 237, winding of relay R—19, to the neutral of battery B. By closing its contacts g, relay R—19 completes a locking circuit for itself from the neutral of battery B through the winding of the relay R—19, conductor 237, contacts g of relay R—19, conductor 242, contacts d of relay LN, conductor 150, contacts d of relay S—3 to the positive terminal of battery B. By closing its contacts a, relay R—19 completes a circuit from the positive terminal of battery B through contacts a of relay R—19, conductor 238, contacts g of relay C—2, conductor 239, contacts h of relay D, conductor 240, contacts c of relay 4, conductor 148, wiper and contact 16 of bank 2—F4, conductor 149, winding of relay IR—32 to the neutral of battery B and also from the conductor 149 through the amber lamp AM—32 to the neutral of battery B. The current through the winding of the relay IR—32 is in the proper direction to cause the relay to close its contacts a, if they are not already closed, and thereby effect the lighting of the green lamp G—32 to indicate that the apparatus unit AU'—32 is in its open position. The lighting of the amber lamp AM—32 informs the dispatcher that the apparatus unit AU'—32 has been selected and may be operated by operating the master control keys MCK and MTK.

Upon the removal of the indication impulse, the equipment operates to transmit back immediately to the remote station a long indication check impulse of the same polarity as the indication impulse. As soon as the relay LP becomes deenergized upon the removal of the indication impulse, a circuit is completed for the relay P from the negative terminal of battery B through the winding of the relay P, conductor 151, wiper and contact 17 of bank 1—S2, conductor 152, contacts f of relay S—2, conductor 244, contacts c of relay R—19, conductor 245, contacts d of relay C—3, conductor 246, contacts g of relay LN, conductor 154, contacts g of relay LP, conductor 155, contacts a of relay C—2, conductor 247, wiper and contact 17 of bank 1—S4 to the neutral of battery B. Relay P, by closing its contacts a, connects the positive terminal of battery B to the line conductor L—1 and by closing its contacts c connects the neutral of battery B to the line conductor L—2 so that a positive impulse is transmitted over the line conductors to the remote station. At the same time that the relay P is energized and a circuit is completed for the time relay S—4 from the positive terminal of battery B through contacts i of relay R—19, conductor 248, winding of relay S—4, conductor 246, contacts g of relay LN, conductor 154, contacts g of relay LP, conductor 155, contacts a of relay C—2, conductor 247, wiper and contact 17 of bank 1—S4 to the neutral of battery B. After being energized for a predetermined time, relay S—4 closes its contacts a to complete a circuit from the positive terminal of battery B through contacts i of relay R—19, conductor 248, winding of relay S—2, conductor 249, contacts c of relay S—4 to the neutral of battery B. After being energized for a predetermined length of time, relay S—2 opens its contacts f in the heretofore traced circuit for the relay P so as to remove the indication check impulse from the line conductors. Relays S—2 and S—4 remain energized however until either relay LP or LN is again energized.

At the remote station the indication check impulse energizes the relay L' so that it closes its contacts a and completes the energizing circuit for the relay L'P'. By closing its contacts e, relay L'P' completes a circuit from the positive terminal of battery B' through contacts e of relay L'P', conductor 314, contacts c of relay R'—18, conductor 526, contacts d of relay C'—5, conductor 424, contacts b of relay R'—21, conductor 425, winding of relay R'—19 to the negative terminal of battery B'. When the indication check impulse is removed from the line conductors, a series energizing circuit is completed for the windings of the relays R'—19 and R'—21 from the positive terminal of battery B' through the contacts h of the relay D'—1, conductor 407, contacts g of relay I'T', conductor 426, winding of relay R'—21, conductor 427, contacts a of relay R'—19, conductor 425, winding of relay R'—19 to the negative terminal of battery B'. The energization of relay R'—21 prepares the circuits for the trip relay R'—22 and the closing relay R'—23 so that they are completed when the dispatcher transmits either a tripping or a closing impulse over the line conductors.

Relay R'—19, by closing its contacts g, completes a circuit from the neutral of battery B' through contacts g of relay R'—19, conductor 429, contacts e of relay I'T', conductor 430, winding of time delay relay C'—4 to the positive terminal of battery B'. If the indication check impulse agrees in polarity with the indication impulse, which is indicated by the simultaneous energization of relays R'—19 and I'T' or of relays R'—20 and I'C', and the indication check impulse is sufficiently long, the time delay relay C'—4 opens its contacts d before the relay R'—21 is energized upon the removal of the indication check impulse from the line conductors. If for any reason the relay C'—4 does not open its contacts d before the relay R'—21 becomes energized a circuit is completed for the reset relay D'—1 from the positive terminal of battery B' through the winding of the relay D'—1, conductor 431, contacts c of relay D'—4, conductor 432, contacts d of relay C'—4, conductor 433, contacts a of relay R'—21 to the neutral of battery B'. The energization of the relay D'—1 resets the equipment to its normal position in a manner which will be hereinafter described. The length of the indication check impulse depends upon the operating time of the time delay relays S—2 and S—4 in the dispatcher's office and the operating times of these relays is normally set so that the indication check impulse is of sufficient duration to allow the relay C'—4 to pick up before the relay R'—21 is energized, in case the polarities of the indication impulse and the indication check impulse agree.

After the amber light AM—32 is lighted, the dispatcher moves the check key DK—32 to its opposite position, thereby connecting the conductor 165 to the negative terminal of battery B so as to cause the white lamp W—32 to light. Then the dispatcher operates the master closing key MCK so as to close its contacts. A circuit is then completed for the relay N fom the positive terminal of battery B through the winding of the relay N, conductor 135, wiper and contact 17 of bank 1—S3, conductor 157, contacts of the key MCK, conductor 245, contacts d of relay C—3, conductor 246, contacts g of relay LN, conductor 154, contacts g of relay LP, conductor 155, contacts a of relay C—2, conductor 247, wiper and contacts 17 of bank 1—S4 to the neutral of battery B. The energization of the relay N causes a negative control impulse to be transmitted over the line conductors L—1 and L—2 and this control impulse flows as long as the dispatcher maintains the contacts of the key MCK closed.

At the remote station this negative control impulse operates the polarized relay L' and the relay L'N'. By closing its contacts e, relay L'N' completes a circuit from the positive terminal of battery B' through the contacts e of the relay L'N', conductor 317, contacts e of relay R'—21, conductor 434, winding of relay R'—23, conductor 435, contacts c of relay C'—4, conductor 436, contacts d of relay R'—24 to the negative terminal of battery B'. By closing its contacts c, relay R'—23 completes a circuit from the neutral of battery B' through the contacts c of relay R'—23, conductor 437, contacts b of relay R'—24, conductor 454, winding of relay C'—6 to the positive terminal of battery B'. The control impulse must be long enough to allow the time delay relay C'—6 to operate. By closing its contacts c, relay C'—6 completes a circuit from the negative terminal of battery B' through the contacts c of relay C'—6, conductor 438, contacts a of relay R'—23, conductor 439, contacts j of relay S'—1, conductor 349, contacts h of relay 4', conductor 250, wiper and contacts 16 of bank 5—F"3, conductor 251, closing coil CC'—32 to the positive terminal of the battery. The energization of the closing coil CC'—32 closes the apparatus unit AU'—32, in which position it is held by any suitable means, such as the latch L'—32. Preferably the apparatus unit AU'—32 is provided with a suitable trip free arrangement TR'—32, examples of which are well known in the art whereby the unit may open while the closing coil CC'—32 is still energized.

As soon as the relay C'—6 closes its contacts e, a circuit is completed from the neutral of battery B' through the winding of relay C'—5, conductor 440, contacts e of relay C'—6, conductor 441, contacts a of relay L'N' to the positive terminal of battery B'. By closing its contacts a, relay C'—5 completes a locking circuit for itself around the contacts e of the relay C'—6. Therefore, after the relay C'—6 has operated, the relay C'—5 remains energized thereafter until the control impulse is removed from the line conductors and thereby effects the deenergization of the relay L'N'. The relay C'—5, when energized, opens at its contacts d and b respectively the original energizing circuits for the relays R'—19 and R'—20 so that neither of these relays R'—19 and R'—20 can be reenergized as long as a control impulse continues to be transmitted over the line conductors after the relay C'—5 is energized.

When the apparatus unit AU'—32 moves to its closed position, it opens its auxiliary contacts b and closes its auxiliary contacts a, thereby disconnecting the conductor 344 from the positive terminal of the battery and connecting it to the negative terminal of the battery through conductor 351, and contacts b of relay SC. Since the opening of the auxiliary contacts b of the apparatus unit AU'—32 interrupts the locking circuit for the associated indication relay IA'—32, which includes conductor 355 and contacts a of the relay IA'—32, this relay becomes deenergized. The opening of the auxiliary contacts b of apparatus unit AU'—32 also interrupts the heretofore described circuit for relay I'T'.

By opening its contacts g, relay I'T' interrupts the heretofore described series energizing circuit for the winding of the relays R'—19 and R'—21 so that these relays become deenergized. The deenergization of R'—21 in turn effects the deenergization of relays R'—23 and C'—6 and closing coil CC'—32 although the control impulse has not been removed from the line conductors L—1 and L—2. By opening its contacts e, the relay I'T' interrupts the heretofore described circuit of the relay C'—4 so that this relay becomes deenergized, and cannot be energized again until an indication of the new position of apparatus unit AU'—32 has been sent to the dispatcher's office and the correct indication check impulse has been received at the remote station. By closing its contacts d relay I'T' completes an energizing circuit for the relay I'C' from the positive terminal of battery B' through the winding of the relay I'C', conductor 442, contacts d of relay I'T', conductor 443, contacts c of relay S'—1, conductor 343, wiper and contacts 16 of bank 5—F"5, conductor 344, contacts a of apparatus unit AU'—32, conductor 351, contacts b of relay SC, to the negative terminal of battery B'. By closing its contacts c, relay I'C' reverses the potential applied to the conductor 422 and thereby reverses the current through the coil of time relay S'—3 so that this relay becomes deenergized and in turn opens the circuit of time relay S'—2.

The indication of the new position of the breaker cannot be sent back to the dispatcher's office until the control impulse has been removed from the line conductors by the dispatcher's opening the contacts of the control key MCK. When the control impulse is removed from the line conductors the relay L'N' becomes deenergized, and by opening its contacts a, interrupts the heretofore described holding circuit for relay C'—5, also the deenergization of relay L'N' completes a circuit for relay N' from the positive terminal of battery B', through the winding of the relay N', conductor 336, contacts a of relay S'—1, conductor 337, wiper and contact 14 of bank 1—S'6, conductor 353, contacts a of relay I'C', conductor 444, contacts b of relay I'T', conductor 418, contacts b of relay S'—2, conductor 419, contacts c of relay C'—3, and relay C'—2 in parallel, conductor 420, contacts d of relay L'P', conductor 346, contacts d of relay L'N', conductor 347, wiper and contact 14 of bank 1—S'2 to the neutral of battery B'. The energization of the relay N' causes a negative indication impulse to be transmitted over the line conductors to indicate that the apparatus unit AU'—32 is in its closed position. At the same time the relay N' is energized, a circuit is completed from the positive terminal of battery B' through the contacts c of the relay I'C', conductor 422, winding of relay S'—3, to conductor 419, which is connected to the neutral of battery B' in the manner above described. After being energized for a predetermined length of time, relay S'—3 closes its contacts a and thereby completes through contacts c of relay I'C' an energizing circuit for the relay S'—2, which, after being energized for a predetermined time, opens its contacts b, effects the removal of the indication impulse from the line conductors and closes its contacts a to complete a holding circuit for the relay S'—3.

At the dispatcher's office, the negative indication impulse effects the energization of the relays L and LN. By opening its contacts d, relay LN interrupts the heretofore described holding circuit for the relay R—19 so that this relay becomes deenergized. By closing its contacts a, relay LN completes a circuit for the relay R—20 from the negative terminal of battery B through the winding of the relay R—20, conductor 251, contacts e of relay R—18, conductor 114, contacts a of relay LN, conductor 113, contacts d of relay RC to the positive terminal of battery B. By closing its contacts g, relay R—20 completes a locking circuit for itself from the negative terminal of battery B through the winding of the relay R—20, conductor 251, contacts g of relay R—20, conductor 252, contacts d of relay LP, conductor 150, contacts d of relay S—3 to the positive terminal of battery B. By closing its contacts a, relay R—20 connects the conductor 238 to the negative terminal of battery B, thereby reversing the direction of current flow through the winding of the polarized relay IR—32. This reversal of current causes the relay IR—32 to open its contacts a and close its contacts b, thereby reversing the potential applied to the conductor 166 so that the white lamp W—32 and the green lamp G—32 are extinguished and the red lamp R—32 is lighted to indicate to the dispatcher that the apparatus unit AU'—32 is in its closed position.

By opening its contacts g, relay LN interrupts the heretofore described circuit for relay S—4 so that it in turn effects the deenergization of relay S—2.

When the indication impulse is removed from the line conductors, the relay LN becomes deenergized and a circuit is completed for the relay N from the positive terminal of battery B through the winding of the relay N, conductor 135, wiper and contact 17 of the bank 1—S3, conductor 157, contacts h of relay S—2, conductor 255, contacts c of relay R—20, conductor 245, contacts d of relay C—3, conductor 246, contacts g of relay LN, conductor 154, contacts g of relay LP, conductor 155, contacts a of relay C—2, conductor 247, wiper and contact 17 of bank 1—S4 to the neutral of battery B. The energization of the relay N causes a negative indication check impulse to be transmitted over the line conductors L—1 and L—2.

The closing of the contact g of relay LN also completes a circuit from the negative terminal of battery B through contacts i of relay R—20, conductor 248, winding of relay S—4, conductor 246 which is connected to the neutral of battery B in the manner above described. The closing of the contacts a on S—4 completes a circuit for relay S—2 which after a predetermined time opens its contacts h in the above traced circuit of relay N to effect the removal of the negative indication check impulse from the line conductors. The relays S—2 and S—4 however remain energized.

At the substation, the long negative indication check impulse effects the energization of the relays L' and L'N'. By closing its contacts e, relay L'N' completes a circuit from the positive terminal of battery B' through the contacts e of the relay L'N', conductor 317, contacts a of relay R'—18, conductor 528, contacts b of relay C'—5, conductor 445, contacts d of relay R'—21, conductor 446, winding of relay R'—20 to the negative terminal of battery B'. As soon as the indication check impulse is removed from the line conductors, a series locking circuit is completed through the windings of the relays R'—20 and R'—21 from the positive terminal of battery B', contacts h of relay D'—1, conductor 407, contacts g of relay I'C', conductor 426, winding of relay R'—21, conductor 427, contacts a of relay R'—20, conductor 446, winding of relay R'—20, to the negative terminal of battery B'.

By closing its contacts c, relay R'—20 completes an energizing circuit for the relay C'—4 from the positive terminal of battery B' through the winding of the relay C'—4, conductor 430, contacts e of relay I'C', conductor 447, contacts c of relay R'—20 to the neutral of battery B'. If the indication check impulse is of a predetermined duration, relay C'—4 has sufficient time to operate and close its contacts c, before relay R'—21 is energized upon the removal of the indication check impulse. The energization of relay C'—4 completes a circuit from the negative terminal of battery B' through the contacts b of the relay SC, conductor 351, contacts a of selected apparatus unit AU'—32, conductor 344, winding of an indication auxiliary relay IA'—32, conductor 355, contact 16 and wiper of bank 5—F'6, conductor 356, contacts e of relay C'—4, conductor 448, contacts e of relay R'—20, conductor 449, contacts a of relay C'—2 to the neutral of battery B'. By closing its contacts a, relay IA'—32 completes a holding circuit for itself from the conductor 355 to the neutral of battery B'. The circuits at the substation are now in a condition to receive another control impulse if the dispatcher desires to trip the breaker or to receive an impulse to reset the apparatus.

In case the dispatcher desires to trip the apparatus unit AU'—32 after it has been closed, he operates the master trip key MTK so that it closes its contacts and thereby completes a circuit from the negative terminal of battery B through the winding of the relay P, conductor 151, wiper and contact 17 of bank 1—S2, conductor 152, contacts of key MTK, conductor 245, contacts d of relay C—3, conductor 246, contacts g of relay LN, conductor 154, contacts g of relay LP, conductor 155, contacts a of relay C—2, conductor 247, wiper and contact 17 of bank 1—S4 to the neutral of battery B. The energization of the relay P causes a positive control impulse to be transmitted over the line conductors L—1 and L—2.

At the remote station, a positive control impulse effects the energization of the relays L' and L'P'. By closing its contacts e, relay L'P' completes a circuit from the positive terminal of battery B' through the contacts e of relay L'P', conductor 314, contacts c of relay R'—21, conductor 450, winding of relay R'—22, conductor 435, contacts c of relay C'—4, conductor 436, contacts d of relay R'—24, to the negative terminal of battery B'. By closing its contacts c, relay R'—22 completes a circuit from the positive terminal of the battery through the winding of the relay C'—6, conductor 454, contacts b of relay R'—24, conductor 437, contacts c of relay R'—22 to the neutral terminal of the battery.

If the control impulse is of sufficient duration, relay C'—6 closes its contacts a and completes a circuit from the positive terminal of battery B', through the contacts a of the relay C'—6, conductor 451, contacts a of relay R'—22, conductor 452, contacts k of relay S'—1, conductor 358, contacts e of relay 4', conductor 359, wiper and contact 16 of bank 5—F'4, conductor 360, winding of relay TR'—32 to the negative terminal of battery B'. The energization of the relay C'—6 also completes a circuit from the neutral of battery B' through winding of relay C'—5, conductor 440, contacts e of relay C'—6, conductor 441, contacts a of relay L'N' to the positive terminal of battery B'. Relay C'—5, by closing its contacts a completes a locking circuit for itself.

The energization of the relay TR'—32 releases the latch L'—32 so that the apparatus unit AU'—32 moves to its open position, thereby opening its auxiliary contacts a and closing its auxiliary contacts b so that the potential applied to the conductor 344 is reversed. The opening of the auxiliary contacts a of the apparatus unit AU'—32 effects the deenergization of the relay IA'—32 and the relay I'C'. By closing its contacts b, the relay I'C' reestablishes the heretofore described circuit for the relay I'T'. The deenergization of the relay I'C' also effects at its contacts g the interruption of the heretofore described circuit for relays R'—20 and R'—21, which in turn effect the deenergization of relays C'—4, R'—22 and C'—6 and trip coil TR'—32.

When the control impulse is removed from the line conductors L—1 and L—2 by the dispatcher's releasing the trip key MTK, relays L' and L'P' become deenergized and the relay L'P', by opening its contacts a, interrupts the heretofore described locking circuit for the relay C'—5 so that this relay becomes deenergized. By closing its contacts b, relay L'P' completes an energizing circuit from the negative terminal of battery B' through the winding of the relay P', conductor 344', wiper and contact 14 of bank I—S'5, conductor 345, contacts a of relay I'T', conductor 417, contacts d of relay I'C', conductor 418, contacts b of relay S'—2, conductor 419, contacts c of relays C'—3 and C'—2 in parallel, conductor 420, contacts d of relay L'P', conductor 346, contacts d of relay L'N', conductor 347, wiper and contact 14 of bank I—S'2 to the neutral of battery B'. The energization of relay P' causes a long positive indication impulse to be transmitted over the line conductors L—1 and L—2. At the same time the relay P' is energized, a circuit is completed for the time relay S'—3, and this relay, after being energized for a predetermined length of time, completes a circuit for the relay S'—2; which, by opening its contacts b, interrupts the heretofore traced circuit for the relay P' and thereby effects the removal of the positive indication impulse from the line conductors.

At the dispatcher's office the positive indication impulse effects the energization of the relays L and LP. The energization of the relay LP in turn effects, in a manner heretofore described, the deenergization of relay R—20 and the energization of the relays R—19 and IR—32 so that the relay IR—32 causes the red light R—32 to be extinguished and the green light G—32 to be lighted. As soon as the relay LP becomes deenergized when the indication impulse is removed from the line conductors, a circuit is completed for the relay P, in a manner heretofore described, so that a long positive indication check impulse is transmitted over the line conductors L—1 and L—2.

At the remote station, this long positive indication check impulse effects, in a manner heretofore described, the energization of the relays L', L'P', and relay R'—19. The energization of the relay R'—19 then completes, through its contacts a, the series energizing circuit for relays R'—19 and R'—21. By closing its contacts e, relay R'—19 completes an energizing circuit for the indication auxiliary relay IA'—32 from the positive terminal of battery B' through contacts d of relay SC, conductor 352 auxiliary contacts b of apparatus unit AU'—32, conductor 344, winding of relay IA'—32 conductor 355, wiper and contact 16 of bank 5—F'6, conductor 356, contacts e of relay C'—4, conductor 448, contacts e of relay R'—19, conductor 449, contacts a of relay C'—2 to the neutral of battery B'. By closing its contacts a, relay IA'—32 completes a locking circuit for itself.

The dispatcher may operate the selected apparatus unit AU'—32 as many times as he desires without releasing the selection. After the last operation has been performed by the dispatcher, he may release the selection by moving the select key SK—32 to its normal open position. For the purpose of this description, it will be assumed that the apparatus unit AU'—32 is in its closed position at the time the dispatcher restores the select key SK—32 to its normal position. Therefore the relays I'C', R'—20 and R'—21 are energized at the remote station and relay R—20 is energized at the dispatcher's office when the dispatcher initials the reset operation.

The opening of the contacts c of the select key SK—32 interrupts the heretofore described holding circuit for the relay 4 so that this relay becomes deenergized. By closing its contacts j, relay 4 completes an energizing circuit for the reset relay D from the positive terminal of battery B to the winding of the relay D, conductor 257, contacts j of the relay I, conductor 160, contacts j of the relay 4, conductor 236, contacts c of relay C—1 to the neutral of battery B. By closing its contacts a, relay D completes a locking circuit for itself from the positive terminal of battery B through the winding of the relay D, conductor 257, contacts a, conductor 258, to the neutral of battery B through contacts a of relay R—2, contacts e of relay R—5, contacts e of relay R—8, contacts e of relay RO, contacts a of relay S—2, contacts g of relay R—11, contacts c of relay R—14, contacts c of relay R—17, contacts a of relay C—1, contacts b of relay N—3 in parallel. By closing its contacts c, relay D completes a circuit from the positive terminal of battery B through the winding of the relay RC, conductor 259, contacts c of relay D to the negative terminal of battery B. By closing its contacts a, relay RC completes a locking circuit for itself from conductor 259 through contacts f of relay LN, conductor 161, contacts a to the neutral terminal of the battery.

By opening its contacts b, relay D interrupts the circuit of the relay C—2 so that this relay returns to its normal position. By opening its contacts f, relay D interrupts the holding circuit for the relay H, and since the original energizing circuit of the relay H is open at the contacts k of the relay 4, relay H is restored to its deenergized position. By opening its contacts h, the relay D interrupts the circuit to the wiper of the bank 2—F4 so that none of the indication relays similar to relay IR—32 can be operated while the switch 2—F is returning to its normal position. By opening its contacts i, relay D interrupts the heretofore described holding circuits for relays RO, RL, R—2, R—3, R—5, R—6, R—8, R—9, R—11, R—12, R—14, R—15, R—17 and R—18. Therefore the heretofore described holding circuits for magnets 1—FM and 2—FM are opened so that a notching circuit is completed through each of these magnets and its respective contacts b to restore the switches 1—F and 2—F to their position 17. As soon as the switch 1—F reaches position 17, the heretofore described series circuit for relay N—1 and magnet 1—FM is completed to effect the operation of the relay N—1. When the switch 2—F reaches its position 17, the heretofore described series circuit for the relay N—2 and the magnet 2—FM is completed to effect the operation of the relay N—2.

When the relay RC becomes energized, the opening of its contacts f opens the heretofore described circuit for the relay S—1 so that this relay closes its contacts b and completes a notching circuit for the magnet 1—SM from the positive terminal of battery B through the contacts b of the magnet 1—SM, wiper and contact 17 of bank 1—S1, conductor 162, contacts b of relay S—1, conductor 208, winding of magnet 1—SM to the negative terminal of battery B. This notching circuit causes the magnet 1—SM to move the switch 1—S to its position 18. Since in positions 18 to 24 a circuit is completed for the relay T—I through the contacts b of the magnet I—SM, a notching circuit is completed for the magnet I—SM to return the switch I—S to its position 0. When the switch I—S reaches position zero, the heretofore described circuit for relay N—3 is completed.

When all of the relays R—I, R—2, R—4, R—5, C—I, R—7, R—8, R—I0, R—II, R—I3, R—I4, R—I6, R—I7, RO, S—I, and S—2 are simultaneously deenergized and the relay N—3 is energized, the heretofore described holding circuit for the relay D is open so that the relay D becomes deenergized. A circuit is then completed for the relay N from the positive terminal of battery B through the winding of relay N, conductor 135, wiper and contact 0 of bank I—S3, conductor 170, contacts e of relay R—20, conductor 260, contacts b of relay S—3, conductor 246, contacts g of relay RC, conductor 261, contacts j of relay D, conductor 262, wiper and contact 0 of bank I—S5 to the neutral of battery B. The energization of the relay N causes a negative reset impulse of a short duration to be transmitted over the line conductors L—I, L—2. The energization of the relay N also completes a circuit from the positive terminal of battery B through the winding of the relay S—3, conductor 268, contacts d of relay D, conductor 264, contacts e of relay N, conductor 161, contacts a of relay RC to the neutral of battery B. By closing its contacts a, relay S—3 completes a locking circuit for itself through conductor 265, contacts e of relay RC, and contacts e of relay S—4 in parallel, conductor 266, contacts c of emergency reset key ERK to the neutral of battery B. By opening its contacts b, the relay S—3 immediately interrupts the heretofore described circuit for the relay N so that the reset impulse is of a short duration. The opening of the contacts d of relay S—3 does not effect the deenergization of relay R—19 because the contacts c of relay RC are closed.

At the substation, this negative reset impulse momentarily effects the energization of the relays N', L'N', and the relay R'—23 in the manner heretofore described. Since the reset impulse is of a relatively short duration, the relay C'—6 is not energized for a sufficient length of time for it to operate. Therefore, when the reset impulse is removed from the line conductors, a circuit is completed from the positive terminal of battery B' through the lower winding of the relay R'—24, conductor 456, contacts b of relay C'—6, conductor 457, contacts e of relay R'—23, conductor 434, winding of relay R'—23, conductor 435, contacts c of relay C'—4, conductor 436, contacts d of relay R'—24 to the negative terminal of battery B'. By closing its contacts c, relay R'—24 completes a holding circuit for the upper winding of the relay R'—24 from the positive terminal of battery B' through the upper winding of the relay R'—24, contacts c of relay R'—24, conductor 449, contacts a of relay C'—2 to the neutral of battery B'. By opening its contacts b, relay R'—24 interrupts the energizing circuit of the relay C'—6 so as to prevent this relay from completing its operation and by opening its contacts d, the relay R'—24 interrupts the circuit of the relay R'—23.

It should be noted that the polarity of the reset impulse is determined by and agrees with the position of the selected apparatus unit. Since in the assumed case the apparatus unit AU'—32 is closed, the reset impulse is a negative impulse.

By closing its contacts a, relay R'—24 completes an energizing circuit for relay D'—I from the positive terminal of the battery B', winding of relay D'—I, conductor 431, contacts c of relay D'—4, conductor 432, contacts a of relay R'—24 to the neutral terminal of battery B'. By closing its contacts a, relay D'—I completes a locking circuit for itself from conductor 432 through contacts a of relay D'—I, conductor 462, to the neutral terminal of battery B' through contacts a of relay R'O', contacts e of relay R'—2, contacts e of relay R'—5, contacts e of relay R'—8, contacts g of relay R'—II, contacts e of relay R'—14, contacts e of relay R'—17, contacts g of relay R'—20, contacts f of relay N'O', and contacts e of relay C'—2 in parallel.

By opening its contacts h, relay D'—I opens the heretofore described holding circuits for relays R'O', R'L', R'—2, R'—3, R'—5, R'—6, R'—8, R'—9, R'—II, R'—12, R'—14, R'—15, R'—17, R'—18, R'—20 and R'—21. The deenergization of relay R'—20 interrupts the heretofore described circuit for relay C'—4 so that this relay drops out. By opening its contacts b, relay D'—I opens the heretofore described circuit for relays 4' and 5'. By opening its contacts d, relay D'———I opens the heretofore described circuit for relay C'—2 and by opening its contacts f, relay D'—I opens the heretofore described circuits for relays C'—I and C'—3. Therefore, the heretofore described holding circuits for the operating magnets I—F"M' and 5—F"M' are opened by the deenergization of relays 4', R'—8, R'—II, R'—14 and R'—17, so that a notching circuit is completed through the magnet I—F"M' and its contacts b to restore the switch I—F' to its normal position 17. As soon as the switch I—F' reaches position 17, the heretofore described series circuit for relay N'—I and magnet I—F"M' is completed to effect the operation of the relay N'—I.

When the holding circuit for the operating magnet 5—F"M' is opened, a notching circuit is completed for this magnet from the positive terminal of battery B' through contacts f of relay R'—3, conductor 524, contacts b of relay C'—4, conductor 413, contacts e of relay N'—2, conductor 365, contacts d of relay N'—5, conductor 326, contacts b of magnet 5—F"M', conductor 327, winding of magnet 5—F"M' to the negative terminal of battery B'. This notching circuit causes the magnet 5—F"M' to move the switch 5—F', from position 16 to position 24, in which position a holding circuit is completed for the relay 5—F"M' from the positive terminal of battery B' through lower winding of the relay N'—5, contacts b of relay N'—5, conductor 366, wiper and contact 24 of bank 5—F'I, conductor 327, winding of magnet 5—F"M' to the negative terminal of battery B'. The current in this holding circuit is sufficient to operate the relay N'—5 so that it closes its contacts a and completes the normal holding circuit for the upper winding of the magnet N'—5. By opening its contacts b, relay N'—5 effects the deenergization of the magnet 5—F"M' to cause the magnet to move the switch 5—F' to its position 0.

As soon as the switch I—F' leaves its position 16, the relay S'—I becomes deenergized and by closing its contacts b, completes a circuit from the positive terminal of battery B' through the winding of the relay T'—I, conductor 334, contacts b of magnet I—S'M', conductor 333, wiper and contact 14 of bank I—S'I, conductor 367, contacts b of relay S'—I to the neutral terminal of the battery B'. The energization of the relay T'—1 completes a notching circuit for the magnet 1—S'M' to move the code sender 1—S' from position 14 to its normal position 16.

When the switches 1—F", 2—F", and 5—F" are in their respective normal positions so that the relays N'—1, N'—2, and N'—5 are energized and when the switch 1—S' is also in its position 16, the heretofore described circuit for relay N'O' is completed to establish the normal check circuit through the line conductors L—1 and L—2 and the relays L and L'.

At the substation, the current through the normal check circuit operates the relay L' so that it completes the circuit for the relay L'P', which in turn effects the energization of the relay R'O'. At the dispatcher's office, the current through the normal check circuit causes the relay L to complete the energizing circuit for the relay LN. By opening its contacts f, relay LN opens the circuit of the relay RC which in turn, by opening its contacts g, effects the deenergization of relay S—4 and by opening its contacts c, effects the deenergization of the relay R—20. The e contact of relay S—4 opens to deenergize relay S—3. Relay LN, by closing its contacts a, reestablishes the heretofore described circuit for relay RO, which in turn completes, through its contacts c, the circuit for the start lamp STL, thereby indicating to the dispatcher that the equipment is completely reset.

When the supervisory equipment is at rest and an apparatus unit changes its position, an indication is immediately transmitted to the dispatcher's office to cause the indicating lamps individual to the operated apparatus unit to indicate the new position of the operated apparatus unit. For an example it will be assumed that while the equipment is at rest the apparatus unit AU'—32 is automatically opened.

When the apparatus unit AU'—32 opens a locking circuit of the associated indication auxiliary relay IA'—32 is opened at the auxiliary contacts a of the apparatus unit AU'—32. By closing its contacts f, relay IA'—32 prepares a holding circuit to contact 16 of the banks 1—F"2 and 5—F"1 so that when switch 5—F" reaches position 16 a holding circuit is completed for the respective operating magnets of switches 1—F" and 5—F". This holding circuit is from the positive terminal of battery B' through contacts i of relay 4', conductor 325, contacts b of relay C'—1, conductor 467, contacts h of relay C'—3, conductor 374, wiper and contact 16 of bank 5—F"2, conductor 373, contacts f of relay IA'—32, conductor 523 to contacts 16 of banks 5—F"1 and 1—F"2.

By closing its contacts b, relay IA'—32 completes a circuit for the relay T'—1 from the positive terminal of battery B', conductor 334, contacts b of magnet 1—S'M', conductor 333, wiper and contact 16 of bank 1—S'1, conductor 332, contacts b of relay IA'—32, conductor 464, contacts c of relay R'O', conductor 310, contacts e of relay N'O' to the neutral terminal of battery B'. The energization of the relay T'—1 effects, in a manner heretofore described, a notching circuit for the relay 1—S'M' so that the switch 1—S' is moved from its position 16 to its position 0. As the switch 1—S'1 moves through its positions 23 and 24 a circuit is completed from the positive terminal of the battery B', winding of relay 5', conductor 320, contacts b of relay D'—1, conductor 409, contacts h of relay 1', conductor 321, winding of relay 4', conductor 322, contacts d of relay IA'—32, conductor 371, wiper and contacts 23 and 24 of bank 1—S'4, conductor 372, contacts g of relay R'O', conductor 465, contacts f of relay C'—3, conductor 466, contacts d of relay C'—1 to the negative terminal of battery B'. By closing its contacts g, relay 4' completes a locking circuit for itself from conductor 371 to conductor 465, so that the relays 4' and 5' remain energized after the switch 1—S' leaves its position 24.

The energization of the relays 4' and 5' effect, in the manner heretofore described, the operation of the finder switches 1—F" and 5—F" to their respective positions 16. As soon as the switch 1—F" stops in position 16, relay S'—1 operates in a manner heretofore described to initiate the operation of the code sender 1—S' so that it moves from its position 0 to its position 14 and during this movement transmits a code of six negative impulses, which is the code individual to the apparatus unit AU'—32. Since the remote station in this case transmits code before it receives code, the relay S'—1, by opening its contacts h, interrupts the original energizing circuit of the relay C'—3 before relay R'—3 is energized. Therefore, when the code sender reaches its position 14, relay P' is not energized to transmit an indication impulse corresponding to the open position of the apparatus unit AU'—32. This indication impulse is not transmitted until the check code has been received from the dispatcher's office. However relay S'—1, by closing its contacts e, completes the heretofore described circuit for the relay I'T' since the apparatus unit AU'—32 is in its open position.

When the normal check circuit through the line conductors L—1 and L—2 is interrupted by the switch 1—S' leaving its normal position 16, relays L and LN at the dispatcher's office are deenergized and the relay LN effects, in a manner heretofore described, the energization of the relay RL. By closing its contacts g, relay RL completes an energizing circuit for the pilot lamp relay PL from the negative terminal of battery B through the winding of relay PL, conductor 272, contacts g of relay RL, conductor 271, contacts b of relay S—4, conductor 270, contacts h of relay S—1 to the positive terminal of battery B. Relay PL, by closing its contacts a, completes a locking circuit for itself through the contacts of the pilot lamp key PLK, and by closing its contacts c completes a circuit for the pilot lamp PLA. The lighting of the lamp PLA in this case, informs the dispatcher that an apparatus unit has changed its position. The dispatcher may extinguish the lamp PLA by operating the lamp key PLK so as to open the locking circuit for the relay PL.

By closing its contacts e, relay RL completes an energizing circuit for the relay C—3 from the positive terminal of battery B through contacts e of relay N—3, conductor 275, contacts f of relay S—1, conductor 274, contacts e of relay RL, conductor 273, winding of relay C—3, conductor 266, contacts c of emergency reset key ERK to the neutral terminal of battery B. By closing its contacts a, relay C—3 completes a locking circuit for itself from conductor 273 through contacts a of relay C—3, conductor 150, contacts d of relay S—3 to the positive terminal of battery B.

At the dispatcher's office the six negative impulses which are transmitted by the code sender 1—S' in response to the automatic operation of the apparatus unit AU'—32 effect the energization of the relays R—2, R—3, R—5, R—6, R—8, R—9, R—11, R—12, R—14, R—15, R—17, and R—18 in the same manner as the check code effects the energization of these relays during a control operation. The energization of the relays R—2 and R—5 complete the heretofore described circuit for the group relay 4. By closing its contacts e, the relay 4 prepares a circuit to release the finder selectors 1—F and 5—F, but this release circuit cannot be completed until the sixth code impulse has been received and has effected the energization of the relay R—18 since the contacts b of relay R—3 are opened before relay 4 is energized. The energized relays R—8, R—11, R—14, and R—17 establish a holding circuit to contact 16 of banks 1—F2 and 2—F2 so that these switches stop in this position when they are set into operation.

When relay R—18 becomes energized upon the removal of the sixth impulse transmitted from the remote station, a circuit is completed from the positive terminal of the battery B through contacts e of relay 4, conductor 127, contacts a of relay R—18, conductor 203, wiper and contact 17 of bank 1—F1, conductor 129, contacts b of magnet 1—FM, conductor 101, winding of magnet 1—FM, to the negative terminal of battery B. This circuit causes the magnet 1—FM to operate to move the switch 1—F from its position 17 to its position 18, in which position a notching circuit is established to effect the movement of the switch 1—F from position 18 to position 16, in which position the heretofore described holding circuit is completed for the magnet 1—FM through the series connected contacts of energized relays R—8, R—11, R—14, and R—17. The closing of the contacts a of the relay R—18 also completes a similar circuit for the magnet 2—FM to effect the movement of the switch 2—F from its position 17 to its position 16.

When the switch 1—F stops in its position 16, the relay S—1 operates to start the code sender 1—S in a manner heretofore described so that a check code of six negative impulses, corresponding to the selection which has been made at the dispatcher's office, is transmitted over the line conductors to the remote station.

This check code of six negative impulses effects the energization of the relays R'—2, R'—3, R'—5, R'—6, R'—8, R'—9, R'—11, R'—12, R'—14, R'—15, R'—17, and R'—18 in the same manner as the six impulses of the select code during a control operation. When relay R'—18 becomes energized in response to the removal of the last impulse of the check code, the heretofore described circuit for relay C'—1 is completed through the contacts g of relay R'—18. By opening its contacts d, relay C'—1 opens the series holding circuit for relays 4' and 5'. However, if the first two impulses of the check code are negative impulses and therefore agree with the first two impulses of the select code transmitted to the dispatcher's office, the series circuit of relays 4' and 5' is maintained completed from the positive terminal of battery B' through winding of relay 5', conductor 320, contacts b of relay D'—1, conductor 409, contacts h of relay 1', conductor 321, winding of relay 4', conductor 322, contacts c of relay R'—5, conductor 517, contacts c of relay R'—2, conductor 411, contacts a of relay 5' to the negative terminal of battery B'.

By opening its contacts b, relay C'—1 opens the heretofore described circuit to the contacts 16 of banks 1—F'2 and 5—F'1. However, if the next four impulses of the check code are negative impulses and therefore agree with the corresponding impulses of the select code which was transmitted to the dispatcher's office, the heretofore described holding circuits for the magnets 1—F"M' and 5—F"M' are completed through the series contacts of the energized relays 4', R'—8, R'—11, R'—14, and R'—17.

If the select and check codes agree, the relay C'—1 maintains its contacts a closed for a sufficient length of time to allow the time relay C'—2 to operate. By closing its contacts g, relay C'—2 completes a circuit around the contacts b of relay C'—1 so as to reestablish the original holding circuits for the magnets 1—F"M' and 5—F"M'. By closing its contacts c, relay C'—2 completes the heretofore described circuit for the relay P' so that a positive indication impulse is transmitted over the line conductors L—1 and L—2. At the same time the relay P' is energized, a circuit is completed for the time relay S'—3, which, when energized, effects the deenergization of the relay P' after it has been energized for a predetermined length of time.

At the dispatcher's office, the positive indication impulse effects the operation of the relay R—19, which, by closing its contacts g, completes a locking circuit for itself through the contacts d of relay LN. By closing its contacts a, relay R—19 completes the heretofore described circuit for the indication relay IR—32 so that this relay opens its contacts b and closes its contacts a, thereby extinguishing the red lamp RE—32 and causing the green lamp G—32 and the white lamp W—32 to be lighted. The dispatcher may extinguish the white lamp by moving the key DK—32 to its position corresponding to the open position of the apparatus unit AU'—32.

As soon as the indication impulse is removed from the line conductors so that the relay LP closes its contacts g, the heretofore described circuit for the relay S—4 is completed. By closing its contacts a, relay S—4 completes an energizing circuit for the relay D from the positive terminal of battery B through winding of relay D, conductor 257, contacts a of relay S—4, conductor 277, contacts e of relay C—3, conductor 278, contacts a of relay R—3 to the neutral of battery B. The energization of the reset relay D effects the energization of the relays RC and S—3 and the restoration of the switches 1—F, 2—F, and 1—S to their respective normal positions in the manner heretofore described.

After the resetting operation has been effected, only the relays RC, S—3, C—3, and R—19 remain energized at the dispatcher's office. As soon as the code sender 1—S reaches its position 0 and the relay D becomes deenergized, a circuit is completed for the relay P from the negative terminal of battery B through the winding of relay P, conductor 151, wiper and contact 0 of bank 1—S2, conductor 163, contacts e of relay R—19, conductor 260, contacts d of relay S—2, conductor 280, contacts c of relay C—3, conductor 246, contacts g of relay RC, conductor 261, contacts j of relay D, conductor 262, wiper and contact 0 of bank 1—S5 to the neutral of battery B. The energization of the relay P causes a positive reset impulse to be transmitted over the line conductors to the remote station. At the same time that the relay P is energized, a circuit is completed for the relay S—4 through the contacts g of relay RC and the contacts j of the relay D. The relay S—4 effects, in the manner heretofore described, the energization of the relay S—2 so as to effect the deenergization of the relay P after it has been erergized for a predetermined time.

At the remote station, this positive reset impulse effects the energization of the relay R'—19. By closing its contacts g, relay R'—19 completes the heretofore described circuit for the relay C'—4, which in turn, by closing its contacts e, reestablishes the energizing circuit for the indication auxiliary relay IA'—32. Relay IA'—32 picks up and completes a locking circuit for itself through its contacts a. When the positive reset impulse is removed from the line conductors, the series energizing circuit for the relays R'—21 and R'—19 is completed. By closing its contacts a relay R'—21 completes a circuit from the positive terminal of battery B', winding of relay D'—1, conductor 431, contacts c of relay D'—4, conductor 432, contacts b of relay C'—3, conductor 433, contacts a of relay R'—21 to the neutral of battery B'. The energization of the relay D'—1 causes the equipment at the remote station to reset in the manner heretofore described.

When the apparatus at the remote station has returned to its normal position and the relay N'O' is again energized to complete the normal check circuit through the line conductors, the energization of the relay LN at the dispatcher's office effects the deenergization of the relays RC, S—3, C—3, R—19, and completes the circuit for the start lamp STL.

If the first two impulses of the check code do not agree with the first two impulses of the select code so that the group relay associated with the operated select key becomes deenergized when relay C—1 opens its contacts d after the relay R—18 is energized in response to the removal of the last impulse of the check code, a circuit is completed for reset relay D from the positive terminal of battery B, conductor 257, contacts j of relay 1, conductor 160, contacts j of relay 4, conductor 236, contacts c of relay C—1 to the neutral of battery B. The relay D then effects the resetting of the equipment in the manner heretofore described.

If the first two impulses of the check code agree with the first two impulses of the select code, the group relay associated with the operated select key remains energized after relay C—1 opens its contacts d. However, if the last four impulses of the check code do not agree with the last four impulses of the select code, the auxiliary holding circuits for magnets 1—FM and 2—FM are not completed and therefore when relay C—1 opens its contacts b, the magnets 1—FM and 2—FM are deenergized to effect the movement of the switches 1—F and 2—F to their next position. A notching circuit is then completed for each of the magnets to restore the associated switch to its normal position.

As soon as the switch 1—F leaves the position in which it had stopped, relay S—1 moves to its deenergized position and, by closing its contacts c, completes a circuit for relay D from the positive terminal of battery B, through winding of relay D, conductor 257, contacts c of relay S—1, conductor 290, contacts f of relay C—3, conductor 278, contacts a of relay R—3 to the neutral of battery B. The energization of the reset relay D then effects the resetting of the equipment in the manner heretofore described.

If the select key is still in the operated position when the entire equipment has been reset for any reason, the equipment will then function again to try to establish the desired selection.

In case the dispatcher desires to check the position of all of the supervised apparatus units in the remote station, he presses the station check key SCK for a short time interval and then presses the master close key MCK and then releases both keys. The operation of the key SCK effects the transmission of the proper codes to cause the switches 1—F, 2—F, 1—F', and 5—F' to stop in their respective position 1 so that when the dispatcher presses the key MCK it effects the completion of an energizing circuit for the relay SC. By opening its contacts d and b, the relay SC opens the holding circuits of all of the indication relays, such as IA'—1 and IA'—32, so that when the dispatcher resets the apparatus by releasing key SCK the equipment operates to check in sequence all of the supervised units and to energize the associated indication auxiliary relays. The check of each unit is indicated by a momentary flash of the associated amber lamp.

Since the energization of relay PL at the dispatcher's office, while relays S—1 and S—4 are deenergized, effects the operation of the pilot lamp PLA, it will be noted that if either line conductor L—1 or L—2 is opened or a short circuit across the line conductors occurs, the current through relay L will be decreased to cause this relay to drop out and effect the operation of relay PL, so that the pilot lamp PLA is lighted. Similarly, if the battery B' fails, the relay PL is energized and the pilot lamp PLA is lighted to inform the dispatcher that an abnormal condition has occurred.

In order to prevent a reset of the remote station apparatus when potential is first applied to the equipment, the contacts c of relay D'—4 are provided in the energizing circuit of relay D'—1 so that the circuit of relay D'—1 is not completed through contacts c of relay D'—2 or D'—3 when potential is first applied. Both of the relays D'—2 and D'—3 have to be energized so as to complete the circuit of relay D'—4 before relay D'—1 can be energized to reset the remote station apparatus.

If only a portion of a select code is received at the remote station, either relay D'—2 or D'—3 will close its contacts c and complete a circuit for reset relay D'—1. Upon the receipt at the remote station of the first impulse of the select code, contacts j of relay R'—3 open the energizing circuit of relay D'—2 and contacts h of relay R'—3 open the energizing circuit of relay D'—3. If the remaining five impulses of the select code are received at a predetermined rate, the relays L'P' and L'N' function to energize the relays D'—2 and D'—3 intermittently and thereby prevent them from dropping out before relay R'—18 closes its contacts k and i in the holding circuits for relays D'—2 and D'—3, respectively. If for any reason less than a total of six impulses are transmitted, relay D'—3 drops out and by closing its contacts c effects the energization of reset relay D'—1. If for any reason relay L'P' or L'N' or relay N' or P' should remain energized for too long a time, relay D'—2 drops out and by closing its contacts c effects the energization of reset relay D'—1.

It will be observed that the apparatus at the remote station is placed in a condition to receive code when the normal check circuit through line conductors L—1 and L—2 is opened. It is thus necessary to reset the remote station equipment after the line wires are repaired. This may be accomplished by the dispatcher operating and releasing his emergency reset key ERK. By closing the contacts b of the key ERK a circuit is completed by reset relay D, which in turn, to energize closing its contacts c, completes the circuit for relay RC. When the reset key ERK is released, relay D becomes deenergized and by closing its contacts j completes a circuit from the neutral of battery B through wiper and contact 0 of bank 1—S5, conductor 262, contacts j of relay D, conductor 261, contacts g of relay RC, conductor 246, contacts b of relay S—3, conductor 260, contacts b of relay R—20, conductor 281, contacts b of relay R—19, conductor 163, wiper and contact 0 of bank 1—S2, conductor 151, winding of relay P to the negative terminal of battery B. Relay P causes a positive reset impulse to be transmitted to the remote station and also effects the energization of relay S—3, which in turn, by closing its contacts a completes the locking circuit for itself and by opening its contacts b, interrupts the circuit of relay P.

At the remote station the reset impulse effects the energization of relay R'—3, which in turn, by opening its contacts j, effects the deenergization of relay D'—2 so that the reset relay D'—1 is operated to reset the remote station equipment in the manner heretofore described. When the normal check circuit is reestablished after the remote station equipment has been reset, the energization of relay LN causes the relays RC and S—3 at the dispatcher's office to drop out so that the equipment thereat is also restored to its normal condition.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States, is:

1. In combination, a controlling station, a remote station, conductors interconnecting said stations, a plurality of apparatus units at said remote station, each unit having a plurality of positions, means at said controlling station for transmitting over said conductors a select code of impulses individual to each apparatus unit, selecting means at said remote station responsive to said select codes for selecting the corresponding units, means responsive to a selection at said remote station for transmitting over said conductors a check code of impulses individual to the selected apparatus unit followed by an indication impulse of a character varying with the position of the selected apparatus unit, signalling means at said controlling station individual to each apparatus unit, selecting means at said controlling station responsive to said check codes, means controlled by said selecting means at said controlling station for checking the select and check codes and for effecting the selective operation of the signalling means individual to the selected apparatus unit in response to the character of said indication impulse if said codes agree, means responsive to the receipt of said indication impulse at said controlling station for effecting the transmission over said conductors of an indication check impulse, means at said remote station responsive to said indication check impulse for placing the selected apparatus unit in condition to be operated in response to the transmission of a predetermined current impulse over said conductors, and means at said controlling station for effecting the transmission of said predetermined current impulse.

2. In combination, a controlling station, a remote station, conductors interconnecting said stations, a plurality of apparatus units at said remote station, each unit having two positions, means at said controlling station for transmitting over said conductors a select code of impulses individual to each apparatus unit, selective means at said remote station responsive to said select codes for selecting the corresponding units, means responsive to a selection at said remote station for transmitting over said conductors a check code of impulses individual to the selected apparatus unit followed by an indication impulse of a polarity depending upon the position of the selected apparatus unit, signalling means at said controlling station individual to each apparatus unit, selecting means at said controlling station responsive to said check codes, means controlled by said selecting means at said controlling station for checking the select and check codes and for effecting the selective operation of the signalling means individual to the selected apparatus unit in response to the polarity of said indication impulse if said codes agree, means responsive to the receipt of said indication impulse at said controlling station for effecting the transmission over said conductors of an indication check impulse having a polarity depending upon the polarity of the indication impulse, means at said remote station responsive to said indication check impulse if a predetermined relation exists between the polarities of the transmitted indication impulse and the received indication check impulse for placing the selected apparatus unit in condition to be operated in response to the transmission of a predetermined current impulse over said conductors, and means at said controlling station for effecting the transmission of said predetermined current impulse.

3. In combination, a controlling station, a remote station, conductors interconnecting said stations, a plurality of apparatus units at said remote station, each unit having two positions, means at said controlling station for transmitting over said conductors a select code of positive and negative current impulses individual to each apparatus unit, selecting means at said remote station responsive to said select codes for selecting the corresponding units, means responsive to a selection at said remote station for transmitting over said conductors a check code of positive and negative current impulses individual to the selected apparatus unit followed by an indication impulse of a polarity depending upon the position of the selected apparatus unit, signalling means at said controlling station individual to each apparatus unit, selecting means at said controlling station responsive to said check codes, means controlled by said selecting means at said controlling station for checking the select and check codes and for effecting the selective operation of the signalling means individual to the selected apparatus unit in response to the polarity of said indication impulse if said codes agree, means responsive to the receipt of said indication impulse at said controlling station for effecting the transmission over said conductors of an indication check impulse of the same polarity as the received indication impulse, means at said remote station responsive to said indication check impulse for placing the selected apparatus unit in condition to be operated in response to the transmission of a predetermined current impulse over said conductor if the polarities of the transmitted indication impulse and the received indication check impulse agree, and means at said controlling station for effecting the transmission of said predetermined current impulse.

4. In combination, a controlling station, a remote station, conductors interconnecting said stations, a plurality of apparatus units at said remote station, each unit having two positions, means at said controlling station for transmitting over said conductors a select code of positive and negative current impulses individual to each apparatus unit, selecting means at said remote station responsive to said select codes for selecting the corresponding units, means responsive to a selection at said remote station for transmitting over said conductors a check code of positive and negative current impulses individual to the selected apparatus unit followed by an indication impulse of a polarity depending upon the position of the selected apparatus unit, signalling means at said controlling station individual to each apparatus unit, selecting means at said controlling station responsive to said check codes, means controlled by said selecting means at said controlling station for checking the select and check codes and for effecting the selective operation of the signalling means individual to the selected apparatus unit in response to the polarity of said indication impulse if said codes agree, means responsive to the receipt of said indication impulse at said controlling station for effecting the transmission over said conductors of an indication check impulse having a polarity depending upon the polarity of the indication impulse, means at said remote station responsive to said indication check impulse for placing the selected apparatus unit in condition to be operated in response to the subsequent transmission over said conductors of a current impulse of a predetermined polarity depending upon the position of the selected apparatus unit, and means at said controlling station for effecting the transmission of said last-mentioned current impulse of a predetermined polarity.

5. In combination, a controlling station, a remote station, conductors interconnecting said stations, a plurality of apparatus units at said remote station, each unit having two positions, means at said controlling station for transmitting over said conductors a select code of positive and negative current impulses individual to each apparatus unit, selecting means at said remote station responsive to said select codes for selecting the corresponding units, means responsive to a selection at said remote station for transmitting over said conductors a check code of positive and negative current impulses individual to the selected apparatus unit followed by an indication impulse of a polarity depending upon the position of the selected apparatus unit, signalling means at said controlling station individual to each apparatus unit, selecting means at said controlling station responsive to said check codes, means controlled by said selecting means at said controlling station for checking the select and check codes and for effecting the selective operation of the signalling means individual to the selected apparatus unit in response to the polarity of said indication impulse if said codes agree, means responsive to the receipt of said indication impulse at said controlling station for effecting the transmission over said conductors of an indication check impulse of the same polarity as the received indication impulse, means at said remote station responsive to said indication check impulse for placing the selected apparatus unit in condition to be operated in response to the subsequent transmission over said conductors of a current impulse of a predetermined polarity depending upon the position of the selected apparatus unit, and means at said controlling station for effecting the transmission of said last-mentioned current impulse of a predetermined polarity.

6. In combination, a controlling station, a remote station, two conductors interconnecting said stations, a plurality of apparatus units at said remote station, means at said controlling station for selecting an apparatus unit for operation including means for transmitting through said conductors in series a select code of current impulses individual to the desired apparatus unit, means at said remote station responsive to the select code for selecting the apparatus unit individual thereto and for effecting the subsequent transmission through said conductors in series of a check code of current impulses individual to the selected apparatus unit followed by an indication impulse of a character varying with the position of the selected apparatus unit, signalling means at said controlling station individual to each apparatus unit, means at said controlling station responsive to said check code for comparing said check code with the select code and effecting the operation of the signalling means individual to the selected apparatus unit in response to said indication impulse if the select and check codes agree, means responsive to the receipt of said indication impulse at said controlling station for effecting the transmission over said conductors in series of an indication check impulse, and means at said remote station responsive to said indication check impulse for placing the selected apparatus unit in condition to be operated by an impulse of a predetermined polarity transmitted through said conductors in series if the selected unit is in a predetermined position and to be operated by an impulse of the opposite polarity transmitted through said conductors in series if the selected unit is in another position, and means at said controlling station for transmitting through said conductors in series current impulses of opposite polarity to effect the operation of the selected unit.

7. In combination, a controlling station, a remote station, conductors interconnecting said stations, a plurality of apparatus units at said remote station, a select key at said controlling station individual to each apparatus unit, a multiple position selector switch at said controlling station having different positions thereof allotted to different keys, means at said controlling station responsive to a predetermined operation of any select key for effecting the operation of said selector switch to the position thereof allotted to the operated key, means for stopping said switch in the position thereof allotted to the operated key including a holding circuit for said switch and contacts in said holding circuit controlled by the operated key, means dependent upon the stopping of said switch for effecting the transmission over said line conductors of a select code of current impulses individual to the operated key, means at the remote station responsive to said select code for selecting the apparatus unit individual thereto and for subsequently effecting the transmission over said conductors of a check code of current impulses individual to the selected unit, means at said controlling station responsive to said check code for completing a second holding circuit for said selector switch if the check and select codes agree, means at said controlling station responsive to the termination of said check code for opening the first mentioned holding circuit for said selector switch, and means responsive to the simultaneous opening of both of said holding circuits for releasing the established selection.

8. In combination, a controlling station, a remote station, conductors interconnecting said stations, a plurality of apparatus units at said remote station, each unit having a plurality of positions, a select key at said controlling station individual to each apparatus unit, signalling means at said controlling station individual to each apparatus unit, a multiple position selector switch at said controlling station having different positions allotted to different keys, means at said controlling station responsive to a predetermined operation of any select key for effecting the operation of said selector switch to the position thereof allotted to the operated key in which position the signalling means individual to the corresponding apparatus unit is selected for operation and for effecting the subsequent transmission over said line conductors of a select code of current impulses individual to the operated key, a holding circuit for maintaining said selector switch in the position allotted to the operated key, means at the remote station responsive to said select code for selecting the apparatus unit individual thereto and for subsequently effecting the transmission over said conductors of a check code of current impulses individual to the selected unit followed by a current impulse of a character varying with the position of the selected unit, means at said controlling station responsive to said check code for completing another holding circuit for said selector switch if the check code agrees with the select code, and means at said controlling station responsive to the termination of said check code for opening said first-mentioned holding circuit for said selector switch and for controlling the selected signalling means so that the indication impulse effects the operation thereof if the select and check codes agree.

9. In combination, a controlling station, a remote station, conductors interconnecting said stations, a plurality of apparatus units at said remote station, each unit having a plurality of positions, a select key at said controlling station individual to each apparatus unit, signalling means at said controlling station individual to each apparatus unit, a multiple position selector switch at said controlling station having different positions allotted to different keys, means at said controlling station responsive to a predetermined operation of any select key for effecting the operation of said selector switch to the position thereof allotted to the operated key in which position the signalling means individual to the corresponding apparatus unit is selected for operation and for effecting the subsequent transmission over said line conductors of a select code of current impulses individual to the operated key, a holding circuit for maintaining said selector switch in the position allotted to the operated key, means at the remote station responsive to said select code for selecting the apparatus unit individual thereto and for subsequently effecting the transmission over said conductors of a check code of current impulses individual to the selected unit followed by a current impulse of a character varying with the position of the selected unit, means at said controlling station responsive to said check code for completing another holding circuit for said selector switch if the check code agrees with the select code, and means at said controlling station responsive to the termination of said check code for opening said first-mentioned holding circuit for said selector switch and for subsequently reestablishing said first-mentioned holding circuit and controlling the selected signalling means so that the indication impulse effects the operation thereof if the select and check codes agree.

10. In combination, a controlling station, a remote station, conductors interconnecting said stations, a plurality of apparatus units at said remote station, a select key at said controlling station individual to each apparatus unit, said keys being arranged in a plurality of groups, a group relay at said controlling station individual to each of said groups of keys, a multiple position selector switch at said controlling station having each of a plurality of its positions allotted to a key in each of said groups, means responsive to a predetermined operation of any select key for effecting the completion of an energizing circuit for the associated group relay and the operation of said selector switch to the position thereof allotted to the operated key, means controlled by the energized group relay and the position of the selector switch for effecting the transmission over said conductors of a select code of current impulses individual to the operated select key, means at the remote station responsive to said select code for selecting the apparatus unit individual thereto and for subsequently effecting the transmission over said conductors of a check code of current impulses individual to the selected unit, means at the controlling station responsive to said check code for completing another circuit for the energized group relay if the check and select codes agree, means at said controlling station responsive to the termination of said check code for opening the original energizing circuit of the energized group relay, and means responsive to the de-energization of the energized group relay for releasing the established selection.

11. In combination, a controlling station, a remote station, conductors interconnecting said stations, a plurality of apparatus units at said remote station, a select key at said controlling station individual to each apparatus unit, said keys being arranged in a plurality of groups, a group relay at said controlling station individual to each of said groups of keys, a multiple position selector switch at said controlling station having each of a plurality of its positions allotted to a key in each of said groups, means responsive to a predetermined operation of any select key for effecting the completion of an energizing circuit for the associated group relay and the operation of said selector switch to the position thereof allotted to the operated key, a holding circuit for the selector switch for maintaining it in the position thereof allotted to the operated key, means controlled by the energized group relay and the position of the selector switch for effecting the transmission over said conductors of a select code of current impulses individual to the operated select key, means at the remote station responsive to said select code for selecting the apparatus unit individual thereto and for subsequently effecting the transmission over said conductors of a check code of current impulses individual to the selected unit, means at the controlling station responsive to said check code for completing another holding circuit for said selector switch if the check and select codes agree, and means at said controlling station responsive to the termination of said check code for opening the original holding circuit of said switch, and means responsive to the simultaneous opening of both of said holding circuits for releasing the established selection.

12. In combination, a controlling station, a remote station, conductors interconnecting said stations, a plurality of apparatus units at said remote station, a select key at said controlling station individual to each apparatus unit, said keys being arranged in a plurality of groups, a group relay at said controlling station individual to each of said groups of keys, a multiple position selector switch at said controlling station having each of a plurality of its positions allotted to a key in each of said groups, means responsive to a predetermined operation of any select key for effecting the completion of an energizing circuit for the associated group relay and the operation of said selector switch to the position thereof allotted to the operated key, means controlled by the energized group relay and the position of the selector switch for effecting the transmission over said conductors a select code of current impulses individual to the operated select key, said select code comprising an impulse code corresponding to the energized group relay followed by an impulse code corresponding to the position of the selector switch, means at the remote station responsive to said select code for selecting the apparatus unit individual thereto and for subsequently effecting the transmission over said conductors of a check code of current impulses corresponding to the selected unit, said check code comprising an impulse code corresponding to said group relay code followed by an impulse code corresponding to said selector switch code, means at the controlling station responsive to said check code for completing another circuit for the energized group relay if the portion of the select and check codes corresponding to the energized group relay agree, means at said controlling station responsive to the termination of said check code for opening the original energizing circuit of the energized group relay, and means responsive to the deenergization of the energized group relay for releasing the established selection.

13. In combination, a controlling station, a remote station, conductors interconnecting said stations, a plurality of apparatus units at said remote station, a select key at said controlling station individual to each apparatus unit, said keys being arranged in a plurality of groups, a group relay at said controlling station individual to each of said groups of keys, a multiple position selector switch at said controlling station having each of a plurality of its positions allotted to a key in each of said groups, means responsive to a predetermined operation of any select key for effecting the completion of an energizing circuit for the associated group relay and the operation of said selector switch to the position thereof allotted to the operated key, a holding circuit for the selector switch for maintaining it in the position thereof allotted to the operated key, means controlled by the energized group relay and the position of the selector switch for effecting the transmission over said conductors of a select code of current impulses individual to the operated select key, said select code comprising an impulse code corresponding to the energized group relay followed by an impulse code corresponding to the position of the selector switch, means at the remote station responsive to said select code for selecting the apparatus unit individual thereto and for subsequently effecting the transmission over said conductors of a check code of current impulses corresponding to the selected unit, said check code comprising an impulse code corresponding to said group relay code followed by an impulse code corresponding to said selector switch code, means at the controlling station responsive to said check code for completing another circuit for the energized group relay if the portions of the select and check codes corresponding to the energized group relay agree and another holding circuit for said selector switch if the remaining portions of said select and check codes agree, means at said controlling station responsive to the termination of said check code for opening the original energizing circuit of the energized group relay and said first-mentioned holding circuit, and means for releasing the established selection in response to the deenergization of the energized group relay and in response to simultaneous opening of both of said holding circuits.

14. In combination, a controlling station, a remote station, conductors interconnecting said stations, a plurality of apparatus units at said remote station, each unit having a plurality of positions, indicating means at said controlling station individual to each apparatus unit, a select key at said controlling station individual to each apparatus unit, said keys being arranged in a plurality of groups, a group relay at said controlling station individual to each of said groups of keys, a multiple position selector switch at said controlling station having a normal position and having each of a plurality of its other positions allotted to a key in each of said groups, means responsive to a predetermined operation of any select key for effecting the energization of the associated group relay and the operation of said selector switch to the position thereof allotted to the operated key to effect the selection of the indicating means individual to the operated key, a holding circuit for said selector switch for maintaining it in the position allotted to the operated key, means controlled by the energized group relay and the position of the selector switch for effecting the transmission over said conductors of a select code of current impulses individual to the operated select key, means at the remote station responsive to said select code for selecting the apparatus unit individual thereto and for subsequently effecting the transmission over said conductors of a check code of current impulses individual to the selected unit followed by a current impulse of a character varying with the position of the selected unit, means at the controlling station responsive to said check code for completing another holding circuit for said selector switch if the check code agrees with the select code, and means at said controlling station responsive to the termination of said check code for opening the original holding circuit for said selector switch and for controlling the circuit of the selected signalling means so that if the select and check codes agree the indication impulse effects the operation of the selected signalling means.

15. In combination, a controlling station, a remote station, conductors interconnecting said stations, a plurality of apparatus units at said remote station, each unit having a plurality of positions, indicating means at said controlling station individual to each apparatus unit, a select key at said controlling station individual to each apparatus unit, means at said controlling station responsive to a predetermined operation of any select key for effecting the selection of the signalling means at the controlling station individual to the desired selected unit and the subsequent transmission over said conductors of a select code of current impulses individual to the operated key, means at the remote station responsive to said select code for selecting the apparatus unit individual thereto and for effecting the subsequent transmission through said conductors of a check code of current impulses individual to the selected unit followed by a current impulse of a character varying with the position of the selected unit, means at said controlling station responsive to said check code, and means at said controlling station controlled by said check code responsive means for releasing the selection if said select and check codes do not agree and for effecting the operation of the selected signalling means by said indication impulse if said select and check codes do agree.

16. In combination, a first station, a second station, conductors interconnecting said stations, a plurality of apparatus units at said second station, each unit having a plurality of positions, means at said first station for transmitting over said conductors a select code of impulses individual to each apparatus unit, selecting means at said second station responsive to said select codes for selecting the corresponding units, means responsive to a selection at said second station for transmitting over said conductors a check code of impulses individual to the selected apparatus unit followed by an indication impulse of a character varying with the position of the selected apparatus unit, selecting means at said first station responsive to said check code, means controlled by said selecting means at said first station for checking the select and check codes and if they agree for causing said indicating impulse to operate the signalling means individual to the selected apparatus unit and if they do not agree for releasing the selection.

17. In combination, a controlling station, a remote station, conductors interconnecting said stations, a plurality of apparatus units at said remote station, means for selecting any of said apparatus units for operation including means at said controlling station for transmitting a select code of impulses individual to the desired apparatus unit over said conductors, and means for operating a selected apparatus unit including means at the controlling station for effecting the transmission of a control impulse of current over said conductors, and means at said remote station responsive to said control impulse for effecting the operation of the selected apparatus unit if said control impulse is of a predetermined duration and the release of the selection if said control impulse is less than said predetermined duration.

18. In combination, a controlling station, a remote station, conductors interconnecting said stations, a plurality of apparatus units at said remote station, each unit having a plurality of positions, means at said controlling station for selecting any of said apparatus units for operation including means for transmitting a select code of impulses individual to the desired apparatus unit over said conductors, means at said controlling station for transmitting over said conductors after a unit has been selected either a positive or a negative control impulse, means at said remote station for effecting the operation of the selected apparatus unit in response to said positive control impulse only if the selected unit is in a predetermined position and the impulse is of a predetermined duration and for effecting the operation of the selected apparatus unit in response to said negative control impulse only if the selected unit is in another predetermined position and the impulse is of said predetermined duration, and means for releasing the selection if the transmitted control impulse is less than said predetermined duration.

19. In combination, a controlling station, a remote station, conductors interconnecting said stations, a plurality of apparatus units at said remote station, each unit having a plurality of positions, means for selecting any of said apparatus units for operation including means at said controlling station for transmitting a select code of impulses individual to the desired apparatus unit over said conductors, means at said controlling station for transmitting a control impulse over said conductors after a unit has been selected, means at said remote station responsive to said control impulse for effecting the operation of the selected unit, means responsive to the operation of the selected unit for effecting after the termination of the control impulse the transmission over said conductors of an indication impulse of a character corresponding to the new position of the selected apparatus unit, indicating means at said controlling station individual to each apparatus unit, means at said controlling station responsive to said indication impulse for causing the indicating means individual to the selected unit to indicate the new position thereof and for causing an indication check impulse to be transmitted over said conductors to said remote station, and means at said remote station responsive to said indication check impulse for placing the selected unit in condition to be operated in response to the transmission of another control impulse over said conductors.

20. In combination, a controlling station, a remote station, conductors interconnecting said stations, a plurality of apparatus units at said remote station, each unit having a plurality of positions, means for selecting any of said apparatus units for operation including means at said controlling station for transmitting a select code of impulses individual to the desired apparatus units over said conductors, means at said controlling station for transmitting a control impulse over said conductors after a unit has been selected, means at said remote station responsive to said control impulse for effecting the operation of the selected unit, means at said controlling station for transmitting over said conductors after a unit has been selected either a positive or negative control impulse, means at said remote station for effecting the operation of the selected apparatus in response to said positive control impulse only if the selected unit is in a predetermined position and in response to said negative control impulse only if the selected unit is in another predetermined position, means responsive to the operation of the selected apparatus unit in response to either of said control impulses for removing the selected unit from the control of the control impulse which effected its operation, means responsive to the termination of a control impulse for effecting the transmission over said conductors of an indication impulse of a character corresponding to the new position of the selected apparatus unit, indicating means at said controlling station individual to each apparatus unit, means at said controlling station responsive to said indication impulse for causing the indicating means individual to the selected unit to indicate the new position thereof and for causing an indication check impulse to be transmitted over said conductors to said remote station, and means at said remote station responsive to said indication check impulse for placing the selected unit in condition to be operated in response to the transmission of a control impulse of the opposite polarity from that of the control impulse which caused the selected unit to move to its new position.

21. In combination, a first station, a second station, conductors interconnecting said stations, a plurality of apparatus units at said second station, each unit having a plurality of positions, indicating means at said first station individual to each apparatus unit, means responsive to a change in the position of an apparatus unit for effecting the transmission over said conductors of a code of current impulses individual to the changed unit, means at said first station responsive to said code for selecting thereat the indicating means individual to the changed unit for subsequently effecting the transmission over said conductors of a check code corresponding to the selected indicating means, means at said second station responsive to said check code for effecting the transmission over said conductors of an indication impulse corresponding to the new position of the changed unit, means at said first station responsive to said indication impulse for effecting the operation of the selected indicating means to indicate the new position of the changed unit and for subsequently effecting the transmission of an indication check impulse to said second station, and means at said second station responsive to said indication check impulse for restoring said selecting means at said second station to normal.

22. In combination, a first station, a second station, an electric circuit between said stations, a plurality of apparatus units at said second station, means for transmitting over said circuit from said first station to said second station a code of impulses individual to each apparatus unit, means responsive to said codes of impulses for selecting an apparatus unit for operation, means at said second station responsive to a relatively long impulse transmitted over said circuit from said first station to said second station after a unit has been selected for effecting the operation of the unit and to a relatively short impulse for effecting the release of the selection, and means at said first station for effecting the transmission over said circuit of said relatively long and short impulses.

23. In combination, a first station, a second station, an electric circuit between said stations, a plurality of apparatus units at said second station, means for transmitting over said circuit from said first station to said second station a code of impulses individual to each apparatus unit, means at said second station responsive to said codes of impulses for selecting an apparatus unit for operation, means at said second station responsive to an impulse of a predetermined duration transmitted over said circuit to said second station after a unit has been selected for effecting the operation of the unit, means at said second station responsive to an impulse of a duration less than said predetermined duration transmitted over said circuit to said second station after a unit has been selected for effecting the release of the selection, and means at said first station for effecting the transmission over said circuit of said impulses of different durations.

24. In combination, a first station, a second station, an electric circuit between said stations, a plurality of apparatus units at said second station, means for transmitting over said circuit from said first station to said second station a code of impulses individual to each apparatus unit, means responsive to said codes of impulses for selecting an apparatus unit for operation, means at said second station normally operative in response to the termination of an impulse transmitted over said circuit to said second station from said first station after a selection has been made for releasing the selection, and means responsive to an impulse of more than a predetermined duration transmitted over said circuit to said second station from said first station after a selection has been made for rendering said releasing means inoperative to the termination of said impulse of more than said predetermined duration.

LEO D. WHITE.
CLYDE E. STEWART.

CERTIFICATE OF CORRECTION.

Patent No. 2,205,894. June 25, 1940.

LEO D. WHITE, ET AL.

It is hereby certified that error appears in the printed specification of the above numbered patent requiring correction as follows: Page 8, first column, line 41, for "5-F'M" read --5-F'M'--; page 17, second column, line 4, for "thee nergized" read --the energized--; and second column, line 74, for "erergized" read --energized--; page 19, first column, lines 1 and 2, for "completed by reset relay D, which in turn, to energize closing" read --completed to energize reset relay D, which in turn, by closing--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.